(12) United States Patent
Kandori et al.

(10) Patent No.: US 8,393,211 B2
(45) Date of Patent: Mar. 12, 2013

(54) SENSOR

(75) Inventors: Atsushi Kandori, Ebina (JP); Masao Majima, Isehara (JP); Kenichi Nagae, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 896 days.

(21) Appl. No.: 12/104,356

(22) Filed: Apr. 16, 2008

(65) Prior Publication Data
US 2008/0264167 A1 Oct. 30, 2008

(30) Foreign Application Priority Data
Apr. 27, 2007 (JP) .................................. 2007-119641

(51) Int. Cl.
*G01C 19/56* (2006.01)
(52) U.S. Cl. .................................................. 73/504.12
(58) Field of Classification Search ............... 73/504.12, 73/514.32
See application file for complete search history.

(56) References Cited

U.S. PATENT DOCUMENTS

| | | | |
|---|---|---|---|
| 5,586,131 A | 12/1996 | Ono et al. | |
| 5,659,560 A | 8/1997 | Ouchi et al. | |
| 5,796,001 A * | 8/1998 | Greiff et al. | 73/504.16 |
| 5,987,986 A * | 11/1999 | Wyse et al. | 73/504.12 |
| 6,082,197 A * | 7/2000 | Mizuno et al. | 73/514.36 |
| 6,164,134 A * | 12/2000 | Cargille | 73/504.02 |
| 6,349,597 B1 * | 2/2002 | Folkmer et al. | 73/504.02 |
| 6,374,672 B1 | 4/2002 | Abbink et al. | |
| 6,626,039 B1 * | 9/2003 | Adams et al. | 73/504.04 |
| 7,149,442 B2 | 12/2006 | Ushijima et al. | |
| 7,168,320 B2 * | 1/2007 | Murata et al. | 73/514.32 |
| 7,382,137 B2 | 6/2008 | Ushijima et al. | |
| 2001/0008089 A1 | 7/2001 | Abe et al. | |
| 2005/0016273 A1 | 1/2005 | Murata et al. | |

FOREIGN PATENT DOCUMENTS

| | | |
|---|---|---|
| JP | 8-178952 A | 7/1996 |
| JP | 2000-509812 A | 8/2000 |
| JP | 2001-201348 A | 7/2001 |
| JP | 2005-43309 A | 2/2005 |
| JP | 2005-98892 A | 4/2005 |

* cited by examiner

*Primary Examiner* — John Chapman, Jr.
(74) *Attorney, Agent, or Firm* — Fitzpatrick, Cella, Harper & Scinto

(57) ABSTRACT

A sensor includes a detecting oscillator supported in such a manner that the detecting oscillator is allowed to oscillate; first and second electrodes; a detecting electrode facing the first and second electrodes; and signal supplying units configured to supply first and second AC signals respectively to the first and second electrodes. Either the first and second electrodes or the detecting electrode is provided on the detecting oscillator. The first and second AC signals respectively supplied to the first and second electrodes by the signal supplying units cause the detecting oscillator to be maintained at a neutral position for detection without being displaced when no physical quantity is input. When the detecting oscillator is displaced, an input physical quantity is detected on the basis of a signal corresponding to charges induced at the detecting electrode by the first and second AC signals supplied respectively to the first and second electrodes.

5 Claims, 19 Drawing Sheets

SENSOR

BACKGROUND OF THE INVENTION

1. Field of the Invention

The present invention relates to a sensor that detects a physical quantity, such as an angular velocity or an acceleration.

2. Description of the Related Art

Oscillation angular velocity sensors that use micro electro mechanical systems (MEMSs) have been proposed. In this type of angular velocity sensor, an oscillator is caused to perform a reference oscillation with a certain amplitude, and a Coriolis force that is generated upon input of an angular velocity is detected in the form of a displacement of oscillation of the oscillator. The oscillator must be designed so that the oscillator can readily oscillate in a direction for the reference oscillation and in a direction for detection. However, according to this scheme, the reference oscillation could cause oscillation in the direction for detection (a type of oscillation noise), and this might degrade the precision of a detection signal. In a scheme that has been proposed in view of this problem, an oscillator for reference oscillation (reference oscillator) and an oscillator for detection (detecting oscillator) are provided separately (this scheme is called the double-frame scheme).

As an example of a double-frame angular velocity sensor, in an angular velocity sensor proposed in U.S. Pat. No. 6,374,672, a donut-shaped reference oscillator supporting a disk-shaped detecting oscillator is caused to perform a reciprocating rotational oscillation, and the magnitude (maximum inclination) of oscillation caused by an angular velocity of the detecting oscillator provided inner to the reference oscillator is detected. According to this configuration, since it becomes easier to separate oscillation of the reference oscillator and oscillation of the detecting oscillator, the problem of degradation in the precision of a detection signal due to oscillation of the detecting oscillator caused by oscillation of the reference oscillator is alleviated.

In the angular velocity sensor described above, an angular velocity is detected on the basis of inclination of the detecting oscillator about a rotation axis for detection. The degree of inclination of the detecting oscillator can be recognized by detecting change in capacitance between a surface of the detecting oscillator and an opposing surface. More specifically, on a surface opposing the detecting oscillator (denoted by 70 in U.S. Pat. No. 6,374,672), detecting electrodes (denoted by 104 and 106 in FIG. 3 of U.S. Pat. No. 6,374,672) having semicircular shapes are provided. The degree of inclination of the detecting oscillator can be detected by detecting capacitances between the detecting oscillator and the individual detecting electrodes.

FIGS. 12A to 12C show the configuration according to U.S. Pat. No. 6,374,672, in a simplified manner with the reference oscillator omitted. FIG. 12A is a top view in which the vicinity of a detecting oscillator in a double-frame angular velocity sensor is shown as enlarged. FIGS. 12B and 12C are sectional views taken along line XIIB-XIIB perpendicularly to the sheet. In FIGS. 12A to 12C, 401 denotes a detecting oscillator, 402 denotes an upper electrode, 403 denotes a first lower electrode, and 404 denotes a second lower electrode. Furthermore, 405 denotes a left-half upper electrode, 406 denotes a right-half upper electrode, 407 denotes a lower supporting substrate, 408 denotes a rotation axis of the detecting electrode, and 409 denotes supports for the detecting oscillator 401.

In FIG. 12A, the detecting oscillator 401 and the supports 409 are indicated by dotted lines, and the first lower electrode 403 and the second lower electrode 404 provided on the lower supporting substrate 407 are indicated by solid lines. The upper electrode 402 and a reference oscillation generator are not shown in FIG. 12A.

The detecting oscillator 401 has a disk-like shape, and is supported by the supports 409 from above and below as shown in FIG. 12A. The detecting oscillator 401 is designed so that the detecting oscillator 401 can readily perform a reciprocating rotational oscillation in a direction of an arrow R about the rotation axis 408. The detecting oscillator 401 detects a Coriolis force on the basis of the magnitude of inclination of the detecting oscillator 401. On the detecting oscillator 401, the upper electrode 402 is provided. Hereinafter, it is assumed that the upper electrode 402 is composed of the left-half detecting electrode 405 and the right-half detecting electrode 406 on either side of the rotation axis 408.

On the lower supporting substrate 407 facing the upper electrode 402, the first lower electrode 403 and the second lower electrode 404 are provided. The first lower electrode 403 and the second lower electrode 404 are disposed line-symmetrically with respect to a center line (the rotation axis 408) of the supports 409 for the detecting oscillator 401.

Now, a case will be considered where the degree of inclination of the detecting oscillator 401 is detected on the basis of capacitances between the upper electrode 402 on the detecting oscillator 401 and the lower electrodes 403 and 404 on the lower supporting substrate 407.

Next, a capacitance CL between the upper electrode 402 and the first lower electrode 403 in FIG. 12B will be considered. The capacitance CL can be considered as a combined capacitance of a capacitance C1 between the left-half upper electrode 405 and the first lower electrode 403 and a capacitance C3 between the right-half upper electrode 406 and the first lower electrode 403. The distance between the left-half upper electrode 405 and the first lower electrode 403 is shorter than the distance between the right-half upper electrode 406 and the first lower electrode 403. Thus, the capacitance C1 is larger than the capacitance C3.

When the detecting oscillator 401 is inclined about the rotation axis 408 as shown in FIG. 12C, the distance between the detecting oscillator 401 and the first lower electrode 403 increases, and the distance between the detecting oscillator 401 and the second lower electrode 404 decreases. Since the capacitance CL is proportional to the electrode area and is inversely proportional to the distance between electrodes, the value of the capacitance C1 decreases and the value of the capacitance C3 increases. Since the capacitance C1 is larger than the capacitance C3, the amount of decrease in the capacitance C1 is larger than the amount of increase in the capacitance C3. Thus, the value of the combined capacitance CL decreases.

That is, it is possible to detect inclination of the detecting oscillator 401 by detecting an increase in the distance between the left-half detecting electrode 405 and the first lower electrode 403 on the basis of a decrease in the combined capacitance CL. A capacitance CR between the upper electrode 402 on the detecting oscillator 401 and the second lower electrode 404 on the lower supporting substrate 407 can be considered similarly as a combined capacitance of capacitances C2 and C4.

In this specification, a state where no Coriolis force is exerted on a sensor so that the detecting oscillator 401 is not inclined, as shown in FIG. 12B, will be referred to as a "neutral position for detection". The supports 409 for the detecting oscillator 401 are designed so as to form springs such that the detecting oscillator 401 can readily oscillate rotationally in response to even a small Coriolis force. Thus, the detecting oscillator 204 could be caused to oscillate by electrostatic attractive forces caused by signals applied for measurement of inclination of the detecting oscillator 401. If the detecting oscillator 401 is displaced from the neutral position for detection and is caused to oscillate when no physical quantity to be detected is input as described above, then the stability of zero-point output of a detection signal is degraded and thereby sensitivity is degraded.

SUMMARY OF THE INVENTION

The present invention provides a sensor that can accurately detect a displacement such as inclination of a detecting oscillator with high sensitivity so that a physical quantity such as an angular velocity can be measured precisely.

A sensor according to the present invention includes a detecting oscillator supported in such a manner that the detecting oscillator is allowed to oscillate; first and second electrodes configured to receive application of alternating-current (AC) signals; a detecting electrode facing the first and second electrodes; and a signal supplying unit configured to supply first and second AC signals respectively to the first and second electrodes. Either the first and second electrodes or the detecting electrode is provided on the detecting oscillator. The first and second AC signals, respectively supplied to the first and second electrodes, cause the detecting oscillator to be maintained at a neutral position for detection without being displaced when no physical quantity is input. When the detecting oscillator is displaced, an input physical quantity is detected on the basis of a signal corresponding to charges induced at the detecting electrode by the first and second AC signals supplied respectively to the first and second electrodes.

The state described as "the detecting oscillator is maintained at the neutral position for detection" herein is not limited to a state where the detecting oscillator is maintained exactly at the neutral position for detection without being displaced, and covers a range where strictly the detecting oscillator is displaced from the neutral position for detection but still an expected precision of detection according to the present invention is maintained.

In the sensor according to the present invention configured as described above, when no physical quantity is input from outside, the first and second AC signals applied respectively to the first and second electrodes cause the detecting oscillator to be maintained at the neutral position for detection. When a physical quantity is input from outside, the physical quantity is measured using a displacement of the detecting oscillator from the neutral position for detection caused by the physical quantity. Thus, it is possible to accurately detect a displacement such as inclination of the detecting oscillator with high sensitivity, so that a physical quantity such as an angular velocity can be measured precisely.

Further features of the present invention will become apparent from the following description of exemplary embodiments with reference to the attached drawings.

DESCRIPTION OF THE EMBODIMENTS

Embodiments of the present invention will now be described in detail in accordance with the accompanying drawings.

In order to implement a sensor, e.g., an angular velocity sensor, that is capable of detecting a displacement such as a tilt of a detecting oscillator with high sensitivity, according to the present invention, attention is paid to signals applied to electrodes in order to detect capacitances that relate to the position of the detecting oscillator. That is, according to the present invention, a plurality of AC signals are used to detect capacitances.

First Embodiment

Figure 1A:
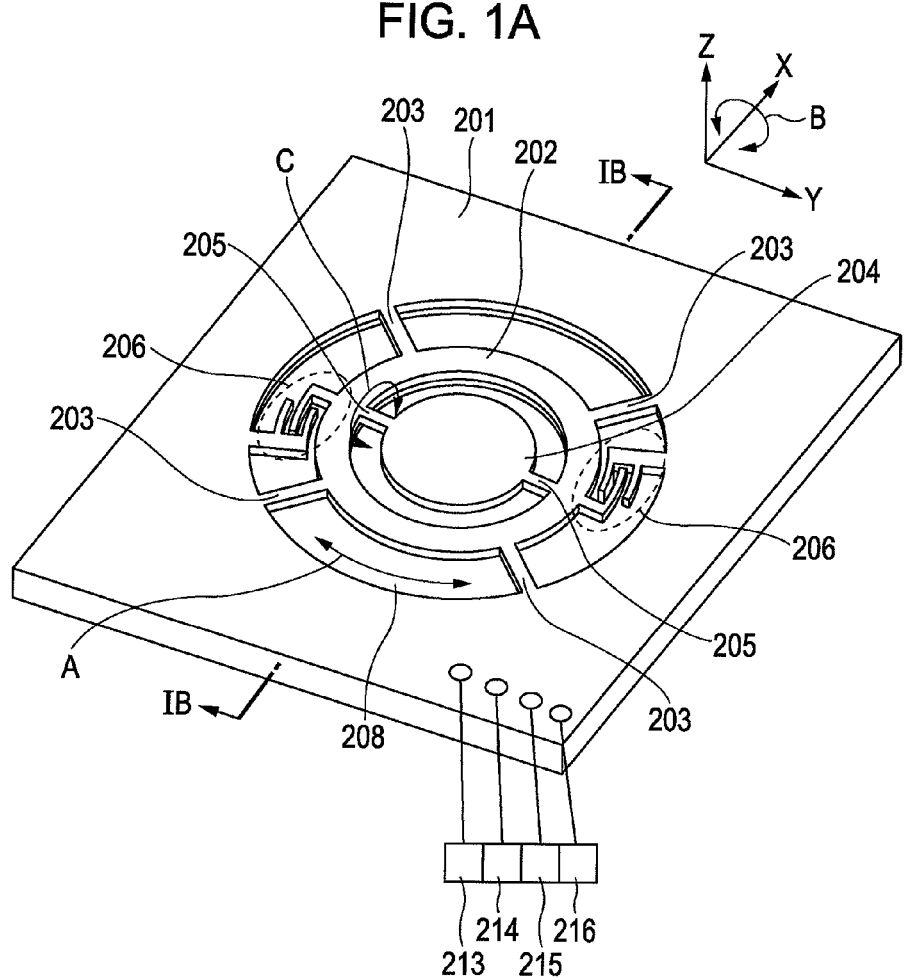
FIG. 1A is a perspective view of an angular velocity sensor according to a first embodiment of the present invention.
Figure 1B:
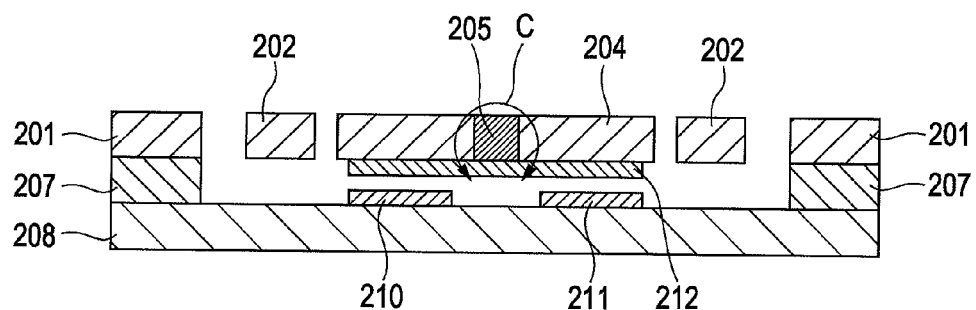
FIG. 1B is a sectional view showing the first embodiment, taken along line IB-IB in FIG. 1A.
Figure 1C:
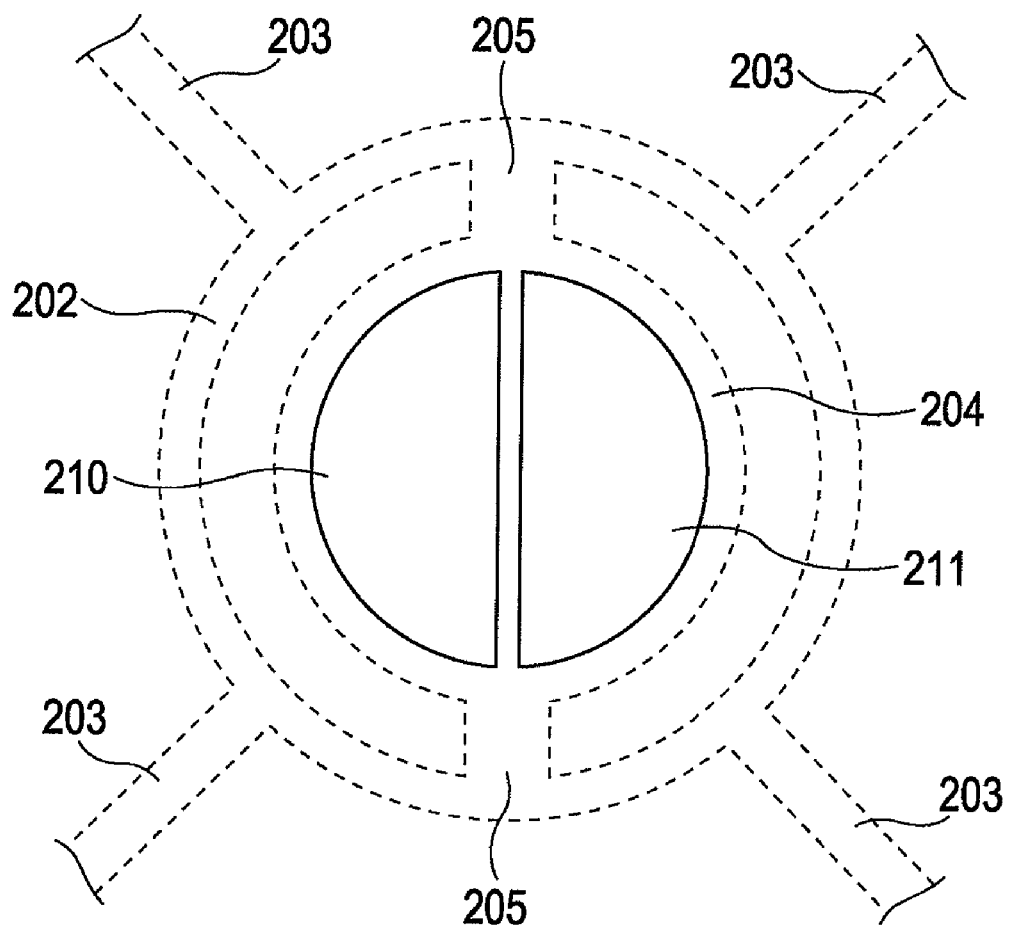
FIG. 1C is a top view of the first embodiment.

FIGS. 1A to 1F are diagrams showing an angular velocity sensor according to a first embodiment. FIG. 1A is a perspective view, FIG. 1B is a sectional view taken perpendicularly to a substrate 201 along line IB-IB, and FIG. 1C is a diagram showing layout of a first electrode (lower electrode) 210 and a second electrode (lower electrode) 211 on a lower supporting substrate 208.

In FIGS. 1A to 1F, 202 denotes a reference oscillator, 203 denotes supports for the reference oscillator 202, 204 denotes a detecting oscillator, 205 denotes supports for the detecting oscillator 204, 206 denotes a reference oscillation generator, 207 denotes a spacer, and 212 denotes a detecting electrode (upper electrode). Furthermore, 213 denotes a driving signal supplying unit that supplies a driving signal to the reference oscillation generator 206, 214 denotes a first signal supplying unit that supplies a first AC signal to the first electrode 210, and 215 denotes a second signal supplying unit that supplies a second AC signal to the second electrode 211. The first signal supplying unit 214 and the second signal supplying unit 215 constitute a signal supplying unit in this embodiment. Furthermore, 216 denotes an amount-of-charge measurement unit 216 that measures a physical quantity, namely, an angular velocity, on the basis of signals relating to charges induced at the detecting electrode 212. These units 213, 214, 215, and 216 are electrically connected individually to relevant parts via electrode pads (connection wires on the substrate 201 are not shown in FIG. 1A).

In FIG. 1C, only the first electrode 210 and the second electrode 211 provided on the lower supporting substrate 208 are shown by solid lines, and other parts are shown by dotted lines. In FIG. 1C, the detecting electrode 212 and the reference oscillation generator 206 are not shown.

In the configuration described above, the detecting oscillator 204 has a disk-like shape, and is supported by the reference oscillator 202 via a pair of supports 205. On a bottom surface of the detecting oscillator 204, the detecting electrode 212 having a circular shape is provided. The reference oscillator 202 has a donut shape, and is supported by the substrate 201 via four supports 203 provided at regular angular intervals. The substrate 201 is connected to the lower supporting substrate 208 via the spacer 207. In a region on the lower supporting substrate 208 facing the detecting electrode 212, the first electrode 210 and the second electrode 211 are provided.

The supports 203 for the reference oscillator 202 are designed so as to form springs such that reciprocating rotational oscillation of the reference oscillator 202 is most likely to occur in the direction of an arrow A about a rotation axis Z, which serves as a second rotation axis, while oscillation in other directions is inhibited. Thus, the reference oscillator 202 is caused by the reference oscillation generator 206 to perform a reciprocating rotational oscillation with the neutral position for detection as the center of oscillation (the origin of reference oscillation). The supports 205 for the detecting oscillator 204, which is supported by the reference oscillator 202 in such a manner that oscillation is allowed, are designed so as to form springs such that reciprocating rotational oscillation of the detecting oscillator 204 is most likely to occur in the direction of an arrow C about a rotation axis Y, which serves as a first rotation axis, while oscillation in other directions is inhibited.

The reference oscillator 202 is caused to oscillate constantly in the direction of the arrow A about the rotation axis Z (this will be referred to as reference oscillation) by the reference oscillation generator 206 connected to the driving signal supplying unit 213. The detecting oscillator 204 is supported by the reference oscillator 202 via the supports 205 so that the detecting oscillator 204 can perform a reciprocating rotational oscillation in the direction of the arrow A in synchronization with the reference oscillator 202. At this time, the detecting oscillator 204 does not oscillate in the direction of the arrow C. When an angular velocity about the rotation axis X is input, a Coriolis force is exerted on the detecting oscillator 204 in the direction of the arrow C about the rotation axis Y. The Coriolis force causes the detecting oscillator 204 to perform a reciprocating rotational oscillation (this will be referred to as detecting oscillation) in the direction of the arrow C. Since the Coriolis force depends on the magnitude of the angular velocity, the magnitude of the angular velocity can be detected by detecting the magnitude of the detecting oscillation (the magnitude of inclination of the detecting oscillator 204).

In this embodiment, the inclination of the detecting oscillator 204 is detected by measuring the capacitance between the first electrode 210 and the detecting electrode 212 and the capacitance between the second electrode 211 and the detecting electrode 212. More specifically, a first AC signal 301 (shown in FIG. 2A) generated by the first signal supplying unit 214 is applied to the first electrode 210, and a second AC signal 302 (shown in FIG. 2B) generated by the second signal supplying unit 215 is applied to the second electrode 211.

The amount of charges electrostatically induced by the first AC signal 301 and the second AC signal 302 at the detecting electrode 212 is measured by the amount-of-charges measurement unit 216. As the distances between the detecting electrode 212 and the first and second electrodes 210 and 211 decrease so that the capacitances increase from initial states (where no angular velocity about the rotation axis X is input), the amount of induced charges increases (as will be described later with reference to FIGS. 4A to 4D and FIGS. 5A to 5D). Conversely, as the distances between the detecting electrode 212 and the first and second electrodes 210 and 211 increase so that the capacitances decrease, the amount of induced charges decreases. The amount of induced charges is converted by the amount-of-charges measurement unit 216 into a detection signal in the form of a voltage or the like. On the basis of the detection signal, it is possible to accurately determine the magnitude of the inclination of the detecting oscillator 204 caused by a Coriolis force generated in response to input of an angular velocity, so that the angular velocity can be determined accurately.

The operations and advantages of providing a plurality of electrodes to which AC signals are applied will be further described.

Figure 2A:
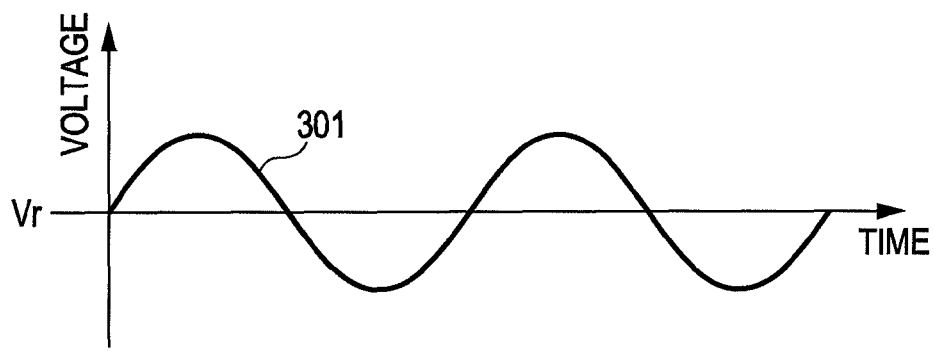
FIGS. 2A to 2C are graphs showing AC signals used in embodiments of the present invention.
Figure 2B:
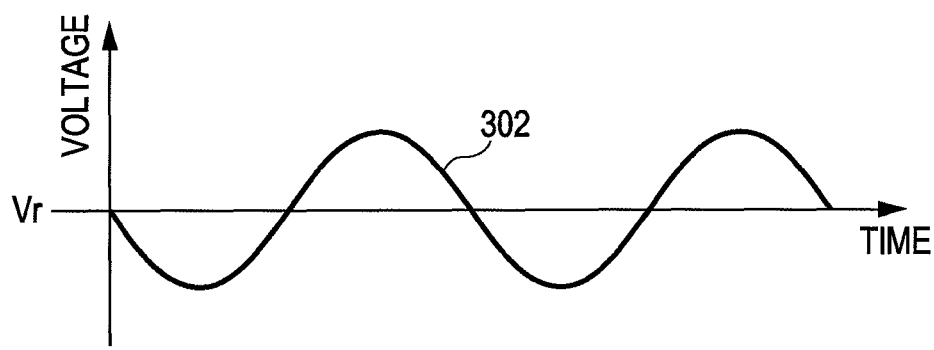
Figure 2C:
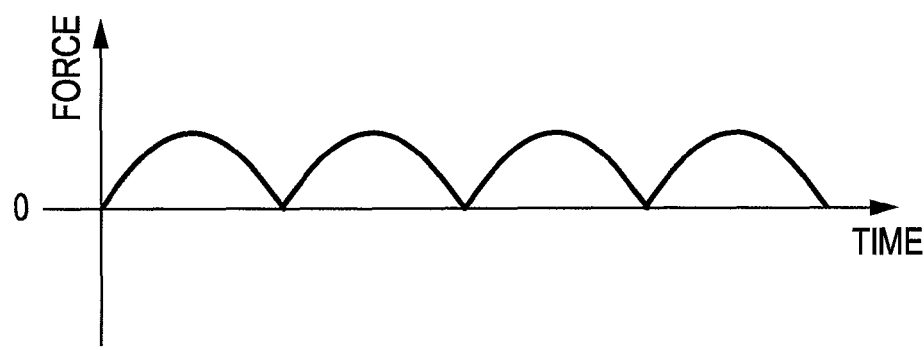

FIGS. 2A and 2B are graphs showing the first AC signal 301 and the second AC signal 302 applied to the first and second electrodes 210 and 211 in this embodiment. FIG. 2C is a graph showing an electrostatic attractive force generated by the first and second AC signals 301 and 302. In FIGS. 2A and 2B showing the first AC signal 301 and the second AC signal 302, the horizontal axis represents time and the vertical axis represents the magnitude of the AC signal. In FIG. 2C, the horizontal axis represents time and the vertical axis represents the magnitude of the electrostatic attractive force. The potential in the case where no charges are induced at the detecting electrode 212 is used as an electrode reference potential Vr. The electrode reference potential Vr is determined according to a potential assigned to the detecting electrode 212 by the amount-of-charges measurement unit 216.

The first AC signal 301 (shown in FIG. 2A) and the second AC signal 302 (shown in FIG. 2B) have the same frequency and mutually opposite phases with reference to the electrode reference potential Vr. Regarding electrostatic forces, it is possible to assume herein that only attractive forces are generated and repulsive forces are not generated. Thus, the forces exerted on the detecting oscillator 204, having the detecting electrode 212, by the supply of the first and second AC signals 301 and 302 to the first and second electrodes 210 and 211 can both be represented as shown in FIG. 2C. That is, by using the AC signals 301 and 302, it is possible to exert attractive forces of the same magnitude on the detecting oscillator 204 from the first electrode 210 and the second electrode 211 at the same timing.

This is very advantageous to the implementation of an angular velocity sensor with high precision. According to this embodiment, it is possible to exert attractive forces of the same magnitude at the same timing on the detecting oscillator 204 from the first electrode 210 and the second electrode 211 individually, which are located on the left and right sides of the rotation axis of the detecting oscillator 204. Thus, when no angular velocity is input, the detecting oscillator 204 is maintained at the neutral position for detection (the state shown in FIG. 1B, as defined earlier). Accordingly, the risk of the detecting oscillator 204 being caused to oscillate by the AC signals 301 and 302 is reduced considerably.

In order to maintain the detecting oscillator 204 at the neutral position for detection when no angular velocity is input, it is not necessary to apply AC signals of opposite phases as shown in FIGS. 2A and 2B, and alternatively, signals having the same frequency and having the same phase may be applied. Also in this case, it is possible to exert attractive forces of the same magnitude at the same timing on the detecting oscillator 204 from the first electrode 210 and the second electrode 211.

Figure 3A:
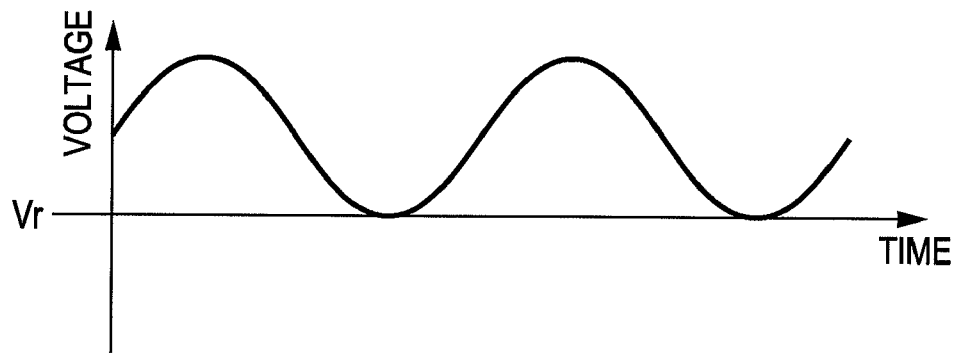
FIGS. 3A to 3C are graphs showing a comparative example of AC signals for comparison with the AC signals shown in FIGS. 2A to 2C.
Figure 3B:
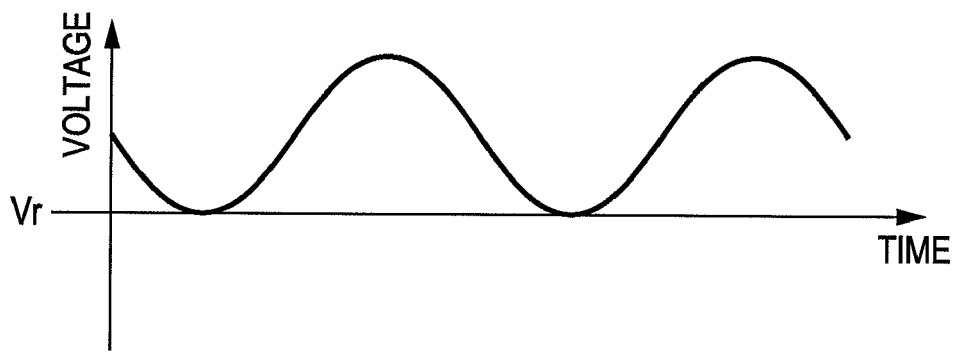
Figure 3C:
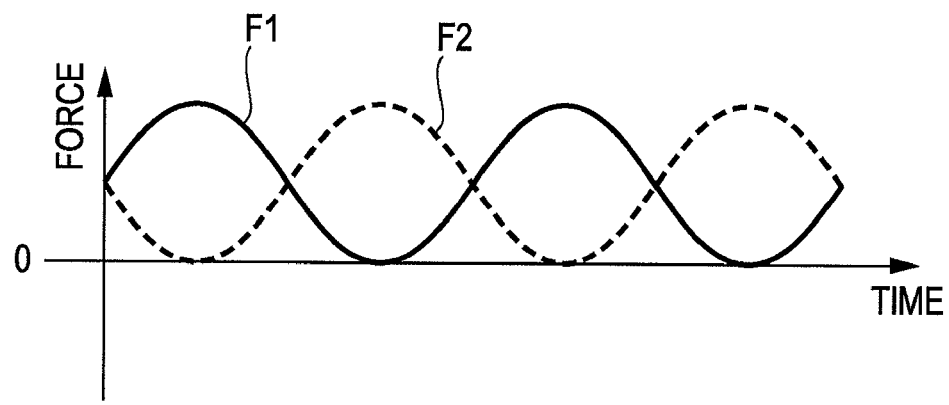

For the purpose of comparison, a case will be considered where a signal shown in FIG. 3A is applied to the first electrode 210 and a signal shown in FIG. 3B is applied to the second electrode 211. In this case, as shown in FIG. 3C, attractive forces F1 and F2 from the first electrode 210 and the second electrode 211 are exerted alternately on the detecting oscillator 204. Thus, if the frequency of these signals applied to the first and second electrodes 210 and 211 is the same as the resonant frequency of the detecting oscillator 204, such a driving force occurs that causes a reciprocating rotational oscillation of the detecting oscillator 204 about the rotation axis Y. Even if the frequency of the applied signals is not the same as the resonant frequency of the detecting oscillator 204, a similar driving force occurs due to non-linear characteristics of the generated electrostatic attractive forces. The oscillation caused in this manner results in generation of a detection signal even when no angular velocity is input (i.e., the detecting oscillator 204 is not maintained at the neutral position for detection). This causes degradation in the performance of angular velocity detection.

As described above, according to this embodiment, attractive forces of the same magnitude are exerted simultaneously on the left and right sides of the detecting oscillator 204, so that the detecting oscillator 204 is maintained at the neutral position for detection when no angular velocity is input. As a result, a reciprocating rotational oscillation about the rotation axis Y is not caused even when AC signals are applied. Thus, when no angular velocity is input, detection noises due to the AC signals 301 and 302 are not likely to occur. Accordingly, particularly in a case where an angular velocity is to be measured with high precision, it is possible to provide an angular velocity sensor in which the stability of output at a zero point of detection signal is achieved so that performance is improved significantly.

Furthermore, in capacitance-based detection, the magnitude of a detection signal for the same inclination of the detecting oscillator 204 increases as the electrodes 210 and 211 are provided closer to the detecting electrode 212. At the same time, however, when the electrodes 210 and 211 are provided close to the detecting electrode 212, electrostatic attractive forces exerted on the detecting oscillator 204 increase. That is, although the sensitivity of angular velocity detection improves, detection noises could occur due to oscillation of the detecting oscillator 204 caused by AC signals. In this embodiment, however, even when the electrodes 210 and 211 are provided close to the detecting electrode 212, attractive forces are exerted precisely at the same time on the left and right sides of the detecting oscillator 204, so that oscillation of the detecting oscillator 204 due to only the AC signals 301 and 302 is not likely to occur. Thus, in this embodiment, even if the first electrode 210 and the second electrode 211 are provided close to the detecting electrode 212, it is possible to suppress detection noises while achieving improved detection sensitivity, so that an angular velocity can be detected with high precision. It is also advantageous in this respect to provide a plurality of electrodes to which AC signals are applied.

Furthermore, by increasing the magnitudes of the AC signals 301 and 302, the magnitudes of detection signals for the same inclination of the detecting oscillator 204 can be increased. Also in this case, however, as the magnitudes of the AC signals 301 and 302 increase, electrostatic attractive forces exerted on the detecting oscillator 204 increase. That is, although the sensitivity of angular velocity detection improves, the detecting oscillator 204 is not maintained at the neutral position for detection, so that the possibility of occurrence of detection noises due to the detecting oscillator 204 being caused to oscillate by the AC signals 301 and 302 increases. However, also in this case, according to this embodiment, attractive forces are exerted precisely at the same time on the left and right sides of the detecting oscillator 204, so that the detecting oscillator 204 is not likely to be caused to oscillate even if the magnitudes of the AC signals 301 and 302 are increased. That is, the detecting oscillator 204 is maintained at the neutral position for detection. Thus, even when the magnitudes of the applied AC signals 301 and 302 are increased, it is possible to suppress detection noises while improving detection sensitivity, so that an angular velocity can be detected with high precision. It is also advantageous in this respect to provide a plurality of electrodes.

Next, the operation of the amount-of-charges measurement unit 216 will be described.

The amount-of-charges measurement unit 216 detects the amount of change in charges electrostatically induced at the detecting electrode 212 by the first and second AC signals 301 and 302 individually applied to the first electrode 210 and the second electrode 211. The principle of this detection will be described with reference to FIG. 1D, FIGS. 4A to 4D, and FIGS. 5A to 5D, in the context of the amount of change in charges induced at the detecting electrode 212 considered as being composed of a left-half detecting electrode 217 and a right-half detecting electrode 218.

Figure 4A:
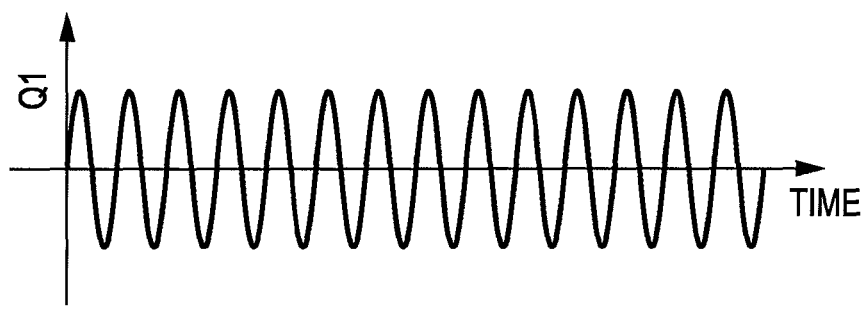
FIGS. 4A to 4D are graphs showing the amounts of charges induced at a detecting electrode by the AC signals in embodiments of the present invention.
Figure 4B:
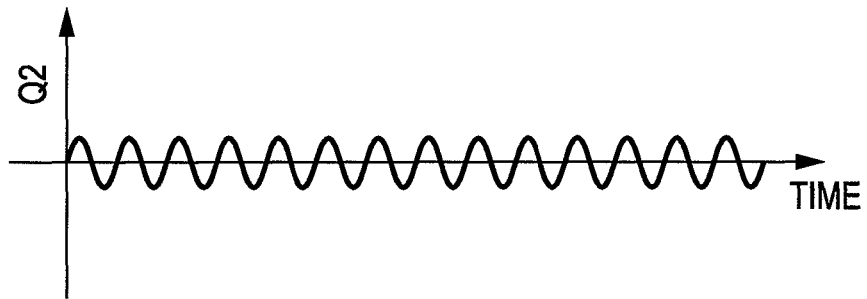
Figure 4C:
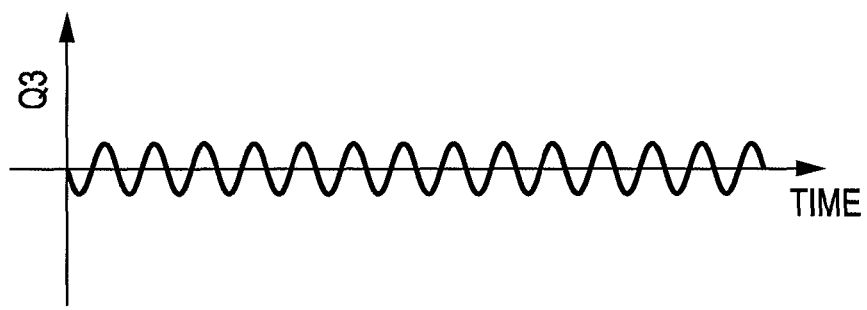
Figure 4D:
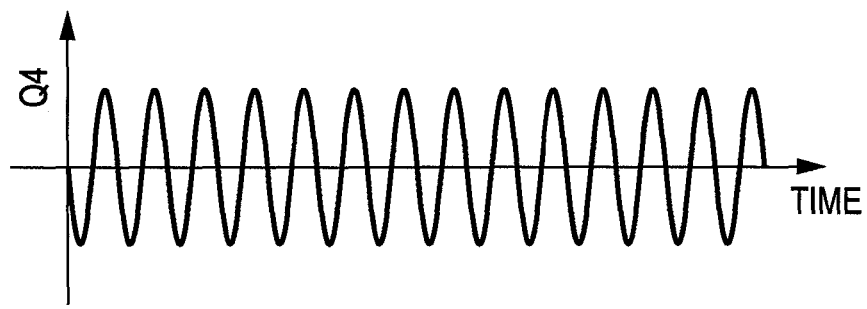
Figure 5A:
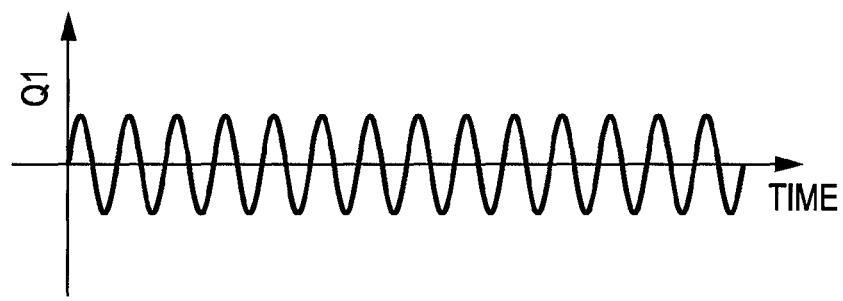
FIGS. 5A to 5D are graphs showing the amounts of charges induced at the detecting electrode by the AC signals when a detecting oscillator is inclined in embodiments of the present invention.
Figure 5B:
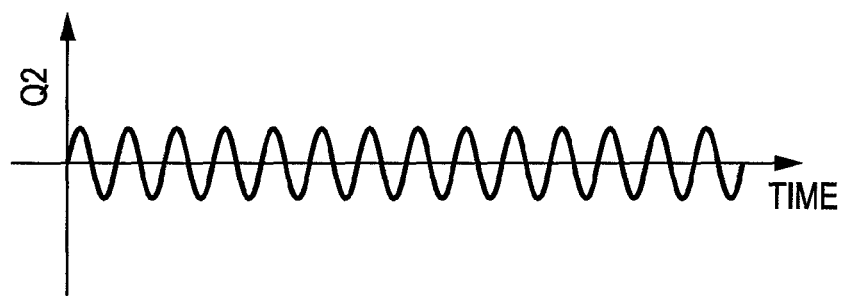
Figure 5C:
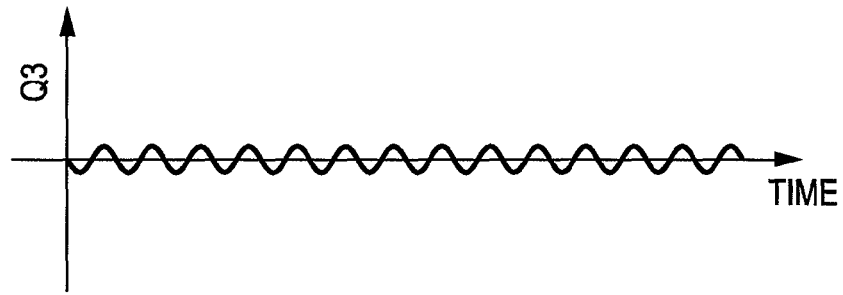
Figure 5D:
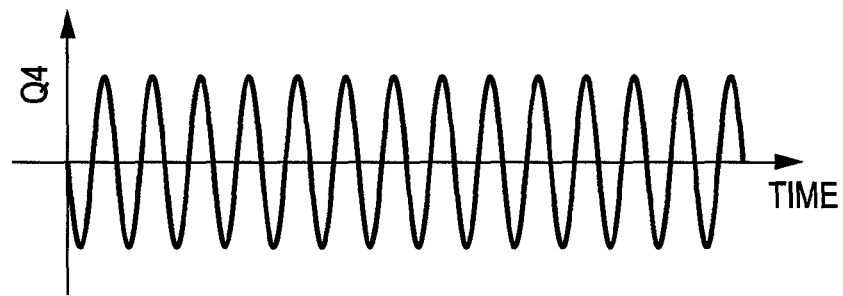

First, a case where the detecting oscillator 204 is not inclined will be described. FIG. 4A shows change in the amount of charges Q1 electrostatically induced at the left-half detecting electrode 217 by the first AC signal 301 applied to the first electrode 210. FIG. 4B shows change in the amount of charges Q2 electrostatically induced at the right-half detecting electrode 218 by the first AC signal 301. FIG. 4C shows change in the amount of charges Q3 electrostatically induced at the left-half detecting electrode 217 by the second AC signal 302. FIG. 4D shows change in the amount of charges Q4 electrostatically induced at the right-half detecting electrode 218 by the second AC signal 302. It is assumed here that the detecting oscillator 204 is maintained for a sufficiently long time without being displaced in relation to the AC signals 301 and 302.

Since the left-half detecting electrode 217 is closer to the first electrode 210 than the right-half detecting electrode 218, Q1 is larger than Q2. Conversely, since the right-half detecting electrode 218 is closer to the second electrode 211 than the left-half detecting electrode 217, Q4 is larger than Q3. In this embodiment, the left-half detecting electrode 217 and the right-half detecting electrode 218 are provided symmetrically with respect to the rotation axis Y, and the first electrode 210 and the second electrode 211 are provided symmetrically with respect to the rotation axis Y. Thus, Q1 is equal to Q4, and Q2 is equal to Q3.

Furthermore, since the first AC signal 301 and the second AC signal 302 have opposite phases, the waveform of Q1 and the waveform of Q4 have mutually opposite phases, and the waveform of Q2 and the waveform of Q3 have mutually opposite phases. Thus, when the detecting oscillator 204 is not inclined, Q1 and Q4 cancel each other, and Q2 and Q3 cancel each other. Accordingly, the total amount of charges induced at the detecting electrode 212 becomes zero, so that no detection signal is output as a result.

Figure 1D:
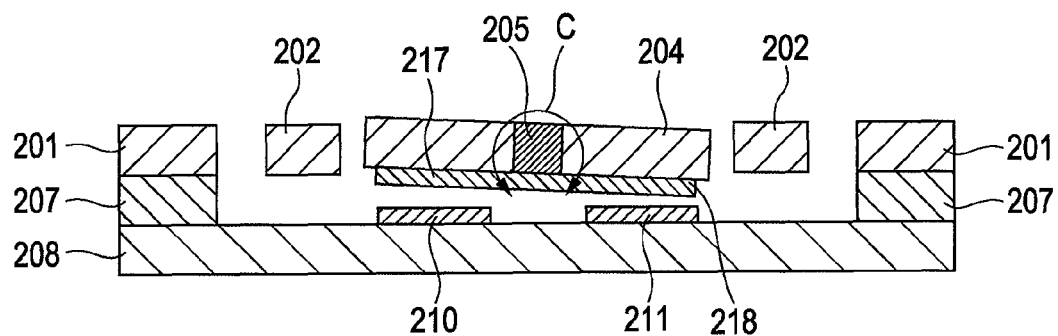
FIG. 1D is a sectional view of the first embodiment.
Figure 1E:
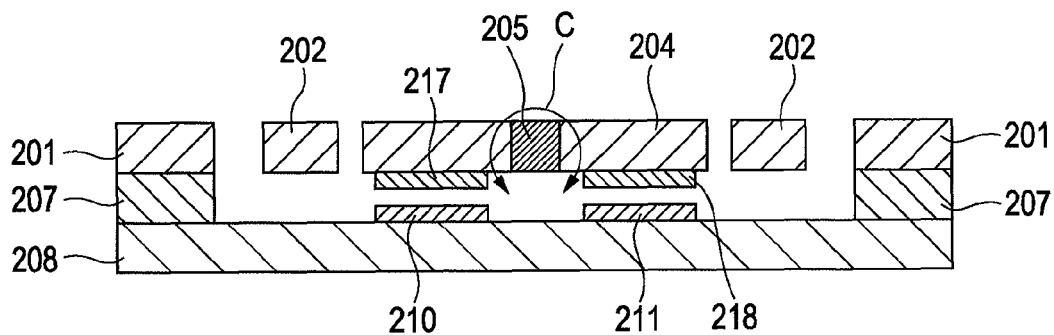
FIG. 1E is a sectional view of a modification of the first embodiment.
Figure 1F:
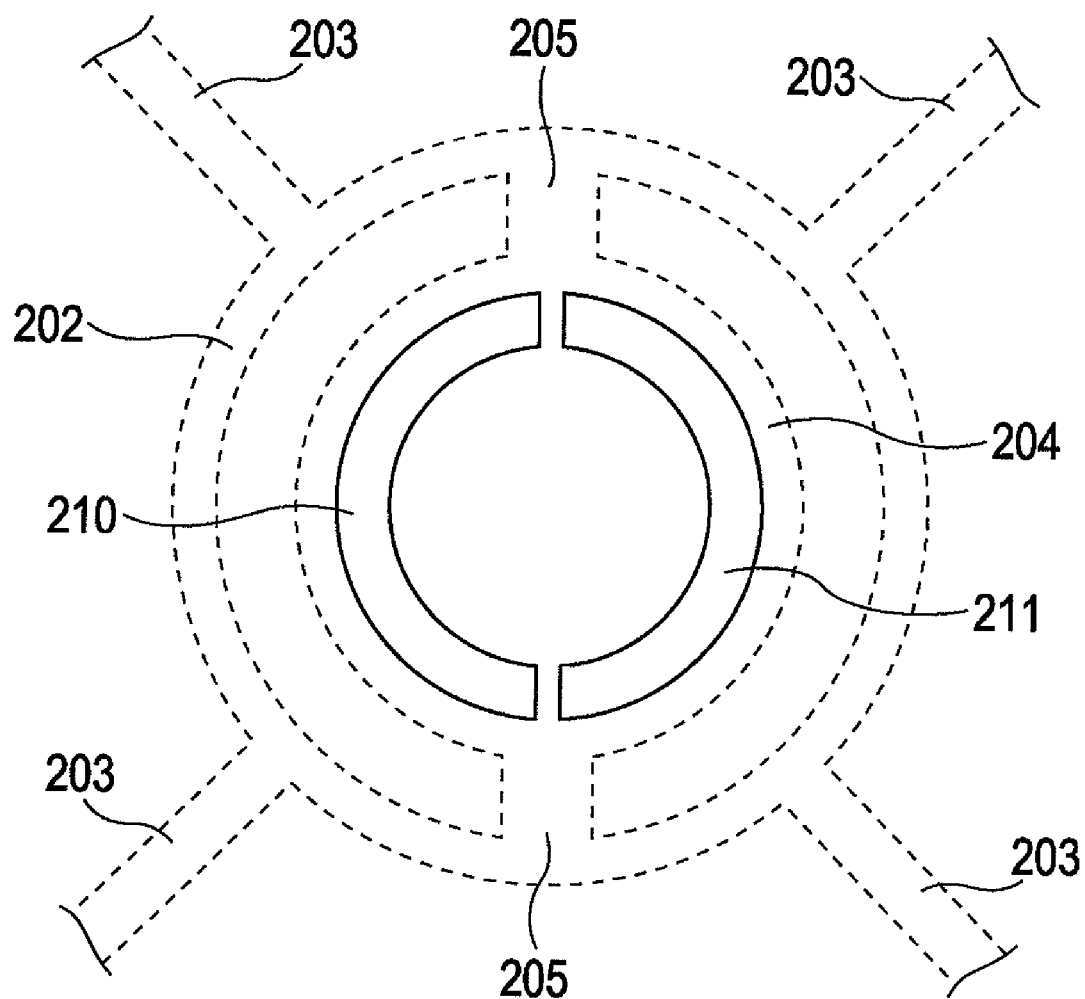
FIG. 1F is a top view of the modification of the first embodiment.

Next, a case where the detecting oscillator 204 is inclined with its right side down as shown in FIG. 1D will be described. FIGS. 5A, 5B, 5C, and 5D show changes in the amounts of charges Q1, Q2, Q3, and Q4 in this case. It is assumed here that the inclination of the detecting oscillator 204 is maintained for a sufficiently long time without being displaced in relation to the AC signals 301 and 302.

Compared with the case shown in FIGS. 4A to 4D, Q1 decreases and Q4 increases. Furthermore, since the waveforms of Q1 and Q4 have mutually opposite phases, a sum of the absolute value of the decrease in Q1 and the absolute value of the increase in Q4 is detected as a signal. Similarly, compared with the case shown in FIGS. 4A to 4D, Q2 increases and Q3 decreases. Since the waveforms of Q2 and Q3 have mutually opposite phases, a sum of the absolute value of the decrease in Q3 and the absolute value of the increase in Q2 is detected as a signal.

As described above, according to this embodiment, it is possible to directly detect the amount of charges induced at the detecting electrode 212 facing the electrodes 210 and 211. That is, the amount of change in the capacitance between the electrodes 210 and 211 and the detecting electrode 212 facing the electrodes 210 and 211 can be detected directly by the amount-of-charges measurement unit 216. Thus, the inclination of the detecting oscillator 204 can be detected with high sensitivity.

Furthermore, no detection signal is output when the detecting oscillator 204 is not inclined, and a detection signal proportional to inclination of the detecting oscillator 204 is output when the detecting oscillator 204 is inclined. Thus, it is possible to detect inclination in the vicinity of an inclination of 0 degrees of the detecting oscillator 204 with high sensitivity. This is particularly advantageous in an angular velocity sensor that has to detect small inclinations of the detecting oscillator 204.

As described above, with the angular velocity sensor according to this embodiment, the degree of inclination of the detecting oscillator 204 can be detected with high sensitivity. That is, it is possible to provide an angular velocity sensor with high sensitivity and high precision.

Figure 13A:
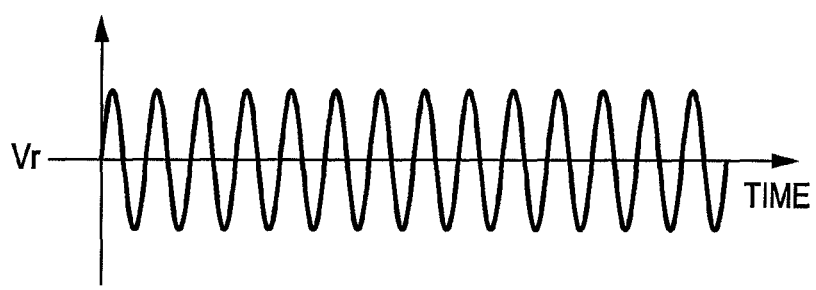
FIGS. 13A to 13E are graphs showing reference potentials used in embodiments of the present invention.
Figure 13B:
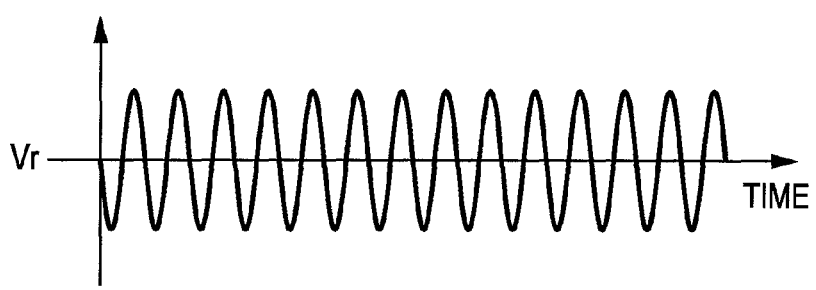

Furthermore, let a reference potential for the first AC signal 301 be denoted by Vr1, a reference potential for the second AC signal 302 be denoted by Vr2, and a reference potential for the detecting electrode 212 be denoted by Vr. By setting different potentials as these potentials Vr1, Vr2, and Vr, it is possible to implement an angular velocity sensor with even higher sensitivity and precision. It is assumed here that the frequency of applied AC signals (carrier signals) is sufficiently higher than the resonant frequency of the detecting oscillator 204. FIGS. 13A and 13B show the first and second AC signals 301 and 302 with reference to the reference potentials Vr1 and Vr2, respectively.

When an angular velocity is input to the sensor, the detecting oscillator 204 performs a reciprocating rotational oscillation with a certain maximum inclination at a frequency of reference oscillation. When this oscillation occurs, the oscillation can be canceled out by adjusting the relationship among the reference potentials Vr1, Vr2, and Vr. The magnitude of an electrostatic attractive force exerted on the detecting oscillator 204 can be calculated from the relationship among the reference potentials Vr1, Vr2, and Vr at this time. Furthermore, the magnitude of a Coriolis force that has occurred can be determined from the magnitude of the electrostatic attractive force.

According to this method, an oscillation detector suffices to simply detect whether oscillation has occurred or not, and the electrostatic attractive force needed for cancelling out oscillation can be calculated from differences between reference potentials. Thus, the sensitivity and precision of detection are improved. Particularly, according to this embodiment, it is possible to generate an electrostatic attractive force for cancelling out oscillation without adding any component. Thus, it is possible to provide an angular velocity sensor with high sensitivity and high precision by a simple configuration.

Figure 13C:
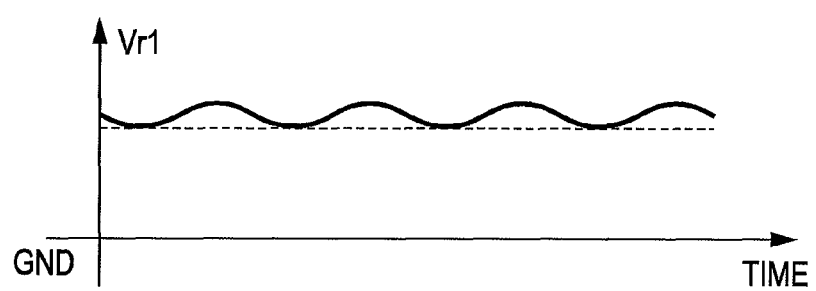
Figure 13D:
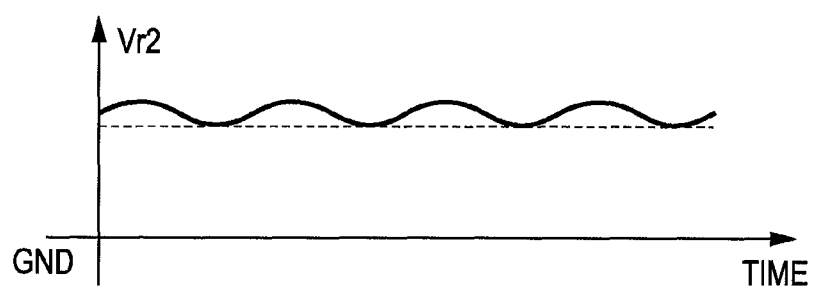
Figure 13E:
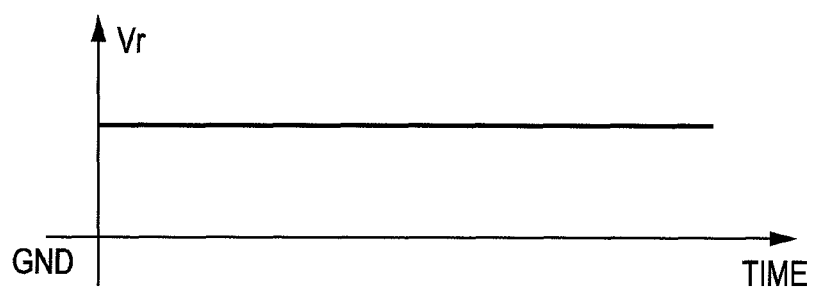

Each of the reference potentials Vr1 and Vr2 is a certain DC component with an AC signal superposed thereon, and the reference potential Vr for the detecting electrode can be composed of only a DC component. FIGS. 13C, 13D, and 13E show the reference potentials Vr1, Vr2, and Vr, respectively. As shown in FIGS. 13C to 13E, the reference potentials Vr1, Vr2, and Vr have the same DC component. The AC components of the reference potentials Vr1 and Vr2 have a frequency corresponding to the frequency of reference oscillation and have mutually opposite phases. Thus, it is possible to generate an electrostatic attractive force according to a potential difference, needed to cancel oscillation of the detecting oscillator synchronized with reference oscillation.

Although the detecting electrode 212 is composed of a single part in the embodiment described above, the present invention is not limited to the embodiment described above. For example, the detecting electrode 212 may be divided into two parts individually corresponding to the first electrode 210 and the second electrode 211. That is, two detecting electrodes 217 and 218 may be provided as shown in section in FIG. 1E. In this case, it is necessary to convert charges induced at the individual detecting electrodes 217 and 218 into voltage signals or the like and to add together the voltage signals or the like. With this configuration, it is possible to reduce the area of each detecting electrode, so that stray capacitance or the like can be reduced. This serves to reduce degradation of signals in the amount-of-charges measurement unit 216.

Furthermore, although the electrodes 210 and 211 have semicircular shapes and the detecting electrode 212 has a circular shape in the embodiment described above, the present invention is not limited to the embodiment. Electrodes having various shapes, such as rectangular shapes, triangular shapes, or polygonal shapes, may be used. For example, the electrodes 210 and 211 may be shaped along the external shape of the detecting oscillator 204, as shown in a top view in FIG. 1F. With this configuration, electrodes are disposed in regions associated with portions of the detecting oscillator 204 where displacement occurs most (i.e., in the vicinity of the periphery of the detecting oscillator 204). Thus, it is possible to detect inclination of the detecting oscillator 204 effectively, and signal degradation due to stray capacitance or the like can be alleviated. Furthermore, although not shown, the detecting electrode 212 may be configured to have a donut shape. As described above, electrodes and detecting electrodes may be formed in regions on the detecting oscillator separated by a certain distance or longer from the first rotation axis and in regions facing the regions on the detecting oscillator.

Furthermore, although the detecting electrode 212 is provided on the detecting oscillator 204 and the electrodes 210 and 211 are provided in regions facing the detecting electrode 212 in the embodiment described above, the present invention is not limited to the embodiment. Alternatively, the electrodes 210 and 211 may be provided on the detecting oscillator 204 and the detecting electrode 212 may be provided in a region facing the electrodes 210 and 211. In this case, by disposing the amount-of-charges measurement unit 216 on the lower supporting substrate 208, the amount-of-charges measurement unit 216 can be provided close to the detecting electrode 212. This serves to alleviate signal degradation caused by stray capacitance of wiring or the like.

Furthermore, although the reference oscillator 202 and the detecting oscillator 204 are provided separately in the embodiment described above, the present invention is not limited to the embodiment. That is, the reference oscillator 202 and the detecting oscillator 204 may be integrated together. In this case, the integrated oscillator is supported by springs of the same supports so that the oscillator can oscillate in two directions, namely, in a direction of reference oscillation and in a direction of detection oscillation. Thus, oscillation noise in the direction of detection oscillation, caused by reference oscillation, tends to occur. This oscillation noise translates to an error in detection of an angular velocity, thereby degrading detection precision of the sensor. More specifically, an angular velocity with a certain value is detected incorrectly even when the angular velocity is actually zero. This degrades the stability of sensor output.

However, with the scheme according to this embodiment, when the detecting oscillator is oscillating even though no angular velocity is input to the sensor, it is possible to cancel out the oscillation to achieve correction. Then, oscillation caused by an angular velocity as described earlier is canceled out on the basis of a difference between reference potential. Thus, an accurate angular velocity can be detected. Accordingly, it is possible to provide an angular velocity sensor having a simple configuration and in which performance degradation due to the effect of reference oscillation is alleviated.

At this time, an oscillation that occurs when no angular velocity is input may be corrected by measuring relationships between temperatures and values for correction at the time of shipping and using a sensor having a table representing the relationship together with a temperature sensor, or correction may be performed after shipping at an arbitrary time so that oscillation is suppressed.

Furthermore, a physical quantity sensor according to a seventh embodiment shown in FIG. 11 and described later may be used. More specifically, it is possible to implement a sensor that detects a physical quantity exerted on a detecting electrode, in which outer portions of two reference oscillation generators having comb-shaped electrodes facing each other via a gap are used as first and second electrodes, and in which an entire oscillator including an inner portion is used as the detecting electrode.

These modifications can also be applied to embodiments described below as long as such modifications are structurally possible. For example, the modifications of using two detecting electrodes may be applied to embodiments described below other than an embodiment shown in FIGS. 8B and 8C.

In sum, in a sensor according to the present invention, first and second AC signals are supplied individually to first and second electrodes so that a detecting oscillator is maintained at the neutral position for detection, where the detecting oscillator is not displaced, and a physical quantity is detected on the basis of signals of charges induced at the detecting electrode when the detecting oscillator is displaced. Thus, a physical quantity sensor including a detecting oscillator, a plurality of electrodes, and a detecting electrode facing the plurality of electrodes so that a physical quantity can be detected according to the principle described above can be embodied as a sensor according to the present invention.

Second Embodiment

Figure 6A:
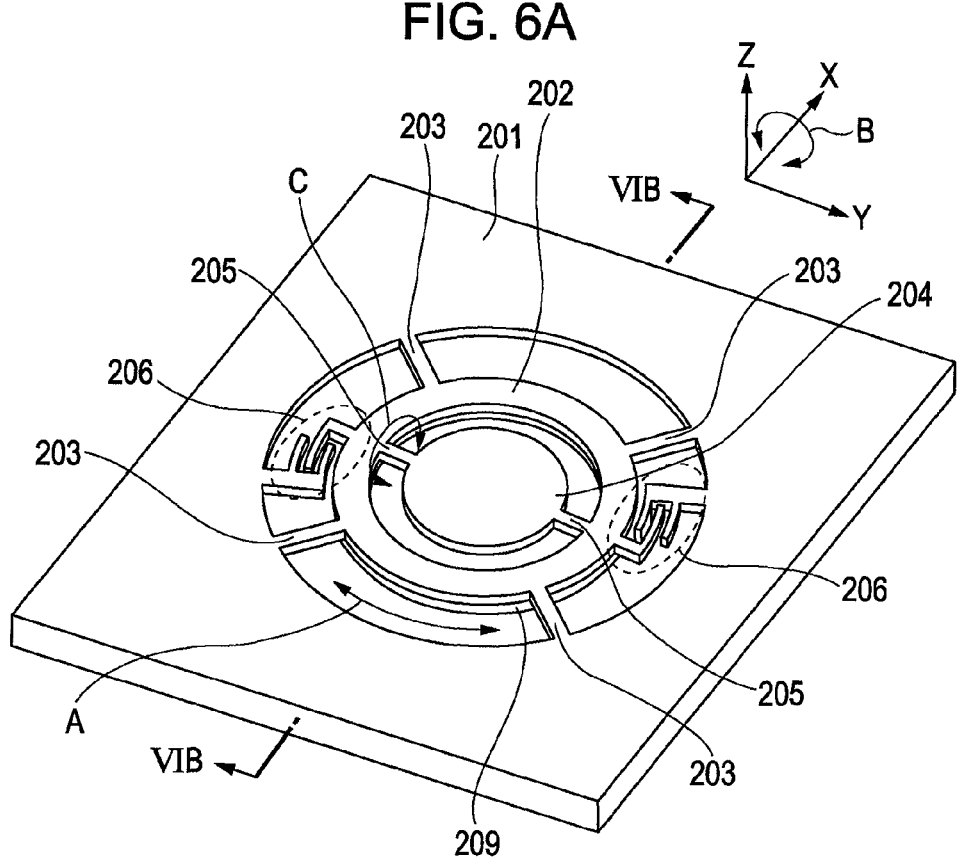
FIG. 6A is a perspective view of an angular velocity sensor according to a second embodiment of the present invention.
Figure 6B:
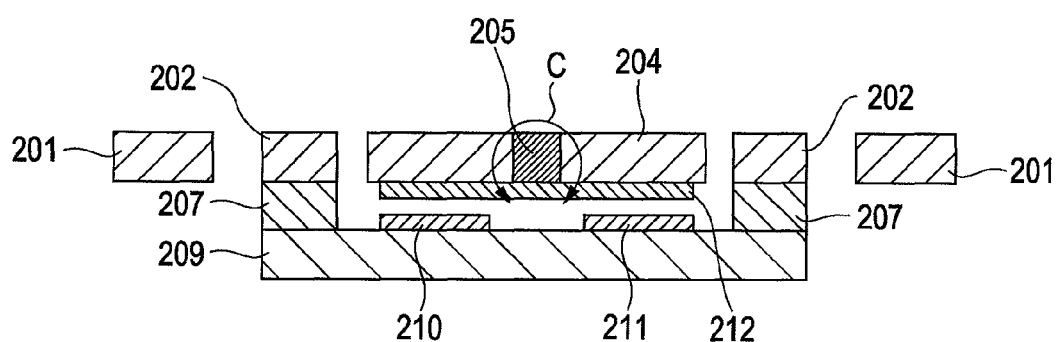
FIG. 6B is a sectional view of the second embodiment, taken along line VIB-VIB in FIG. 6A.

A second embodiment of the present invention will now be described. In an angular velocity sensor according to the second embodiment, shown in FIGS. 6A and 6B, a detecting electrode and electrodes to which AC signals are applied are all provided on the detecting oscillator 204 and the reference oscillators 202 and 209. The configuration of the angular velocity sensor is otherwise the same as that in the first embodiment. FIG. 6A is a perspective view, and FIG. 6B is a sectional view taken perpendicularly to the substrate 201 along line VIB-VIB.

In this embodiment, the reference oscillator 202 is connected to the reference oscillator 209 via the spacer 207 such that the reference oscillator 202 and the reference oscillator 209 are integrated together. The first electrode 210 and the second electrode 211 are provided on the reference oscillator 209 facing the detecting electrode 212. The configuration is otherwise the same as that in the first embodiment.

Now, the operation of this embodiment will be described. The spacer 207 and the reference oscillator 209 integrated with the reference oscillator 202 are caused to oscillate constantly in the direction of the arrow A about the rotation axis Z (reference oscillation) by the reference oscillator 202 together with the reference oscillator 209. Furthermore, since the detecting oscillator 204 is supported by the reference oscillator 202 via the supports 205, the detecting oscillator 204 performs a reciprocating rotational oscillation in the direction of the arrow A in synchronization with the reference oscillator 202. The first electrode 210 and the second electrode 211 are provided on the reference oscillator 209, and the detecting electrode 212 are provided on the detecting oscillator 204. Thus, when reference oscillation occurs ideally, the positional relationships between the first electrode 210 and the detecting electrode 212 and between the second electrode 211 and the detecting electrode 212 are maintained perfectly.

When an angular velocity about the rotation axis X is input, a Coriolis force is exerted on the detecting oscillator 204 in the direction of the arrow C about the rotation axis Y. The principle of detection of the magnitude of an angular velocity based on the Coriolis force has been described earlier in relation to the first embodiment.

In the angular velocity sensor according to this embodiment, the detecting oscillator 204 performs the same reference oscillation as the reference oscillators 202 and 209. With this configuration, even if some variation occurs in the oscillation of the reference oscillators 202 and 209, mechanical contact between the detecting oscillator 204, having the detecting electrode 212 thereon, and a member, having the first and second electrodes 210 and 211 thereon (the reference oscillator 209 in this embodiment), is substantially prevented. Thus, the detecting electrode 212 can be disposed close to the electrodes 210 and 211. Accordingly, when the inclination of the detecting oscillator 204 is detected on the basis of capacitance, the inclination can be detected with high sensitivity.

Also in this embodiment, with AC signals used to detect capacitance, oscillation of the detecting oscillator 204 is inhibited. Thus, it is possible to precisely detect inclination with high stability of output. Particularly, when the detecting oscillator 204 and the reference oscillator 209 are provided close to each other in a configuration where the detecting oscillator 204 performs the same reference oscillation as the reference oscillators 202 and 209, the angular velocity sensor becomes more susceptible to the effect of electrostatic attractive forces generated by AC signals. In this embodiment, however, with the operation of AC signals, the detecting oscillator 204 is maintained at the neutral position for detection. This serves to overcome the problem that the stability of output is degraded even though sensitivity is improved. That is, with the angular velocity sensor according to this embodiment, it is possible to detect an angular velocity with high sensitivity and high stability of output.

Third Embodiment

Next, a third embodiment of the present invention will be described. An angular velocity sensor according to the third embodiment differs from that according to the first embodiment in that the detecting electrode 212 is formed within the detecting oscillator 204. The angular velocity sensor according to the third embodiment is configured otherwise the same as the angular velocity sensor according to the first embodiment.

Figure 7:
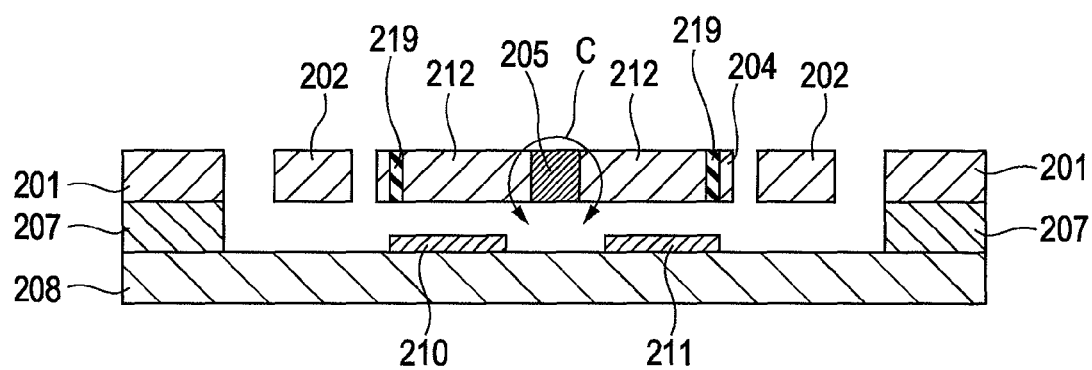
FIG. 7 is a sectional view of an angular velocity sensor according to a third embodiment of the present invention.

FIG. 7 shows the angular velocity sensor according to this embodiment. FIG. 7 is a sectional view taken along a line perpendicular to the substrate 201 in this embodiment. In FIG. 7, 219 denotes an insulating film, and other reference numerals denote components corresponding to those in the first embodiment.

The detecting oscillator 204 has the insulating film 219 buried therein, and is insulated from other parts. A region of the detecting oscillator 204 surrounded by the insulating film 219 is used as the detecting electrode 212. The detecting electrode 212 formed within the detecting oscillator 204 has a low resistance, and it is used as being equivalent to an electrode. From the detecting electrode 212, charges induced at the detecting electrode 212 as described earlier can be extracted using a wire (not shown) on a top surface as shown in FIG. 7.

According to this configuration, it becomes readily possible to extract induced charges from the detecting electrode 212 on the front side of the sensor. This serves to increase design flexibility of the detecting oscillator 204. Furthermore, since the sectional area of the detecting electrode 212 in the detecting oscillator 204 being regarded as a wire is very large, it is possible to alleviate signal degradation when the wire is extended from the detecting electrode 212 to the surface of the detecting oscillator 204. When the feature of this embodiment is not employed, when signals are extracted through a wire from the surface of the detecting oscillator 204 where the detecting electrode 212 is provided, the signal could be degraded by a resistance due to the narrow width of the wire or stray capacitance due to the wire length.

Furthermore, according to this embodiment, without restriction regarding a wire, the shape of the detecting electrode 212 can be designed optimally for detection of inclination of the detecting oscillator 204. Furthermore, it is readily possible to achieve insulation between a driving signal needed for the reference oscillation generator 206 and the detecting electrode 212 having very small induced charges. Thus, it is possible to alleviate degradation of a detection signal caused by a driving signal.

The structure in which the detecting electrode 212 is buried in the detecting oscillator 204 can be readily formed by forming a groove for burying the insulating film 219 in the detecting oscillator 204 and filling the groove with the insulating film 219. Alternatively, a portion of the detecting oscillator 204 corresponding to the detecting electrode 212 may be removed, and the insulating film 219 may be formed in the periphery of the removed portion and then the removed portion may be filled with a conductive material to form the detecting electrode 212. In this case, by choosing the material suitably, it is possible to increase the mass of the detecting oscillator 204, which affects the sensitivity of angular velocity output. Accordingly, it is possible to extract a signal while further alleviating degradation of a detection signal in the detecting electrode 212.

As described above, it is possible to form an electrode or a detecting electrode of a portion of a detecting oscillator insulated by an insulator from other portions. (An electrode can be formed in this manner in the case of a modification where the electrode is provided on a detecting oscillator). According to this embodiment, it is possible to provide an angular velocity sensor in which degradation of a detection signal attributable to a wire through which the detection signal is extracted from the detecting electrode 212 is alleviated.

Fourth Embodiment

Figure 8A:
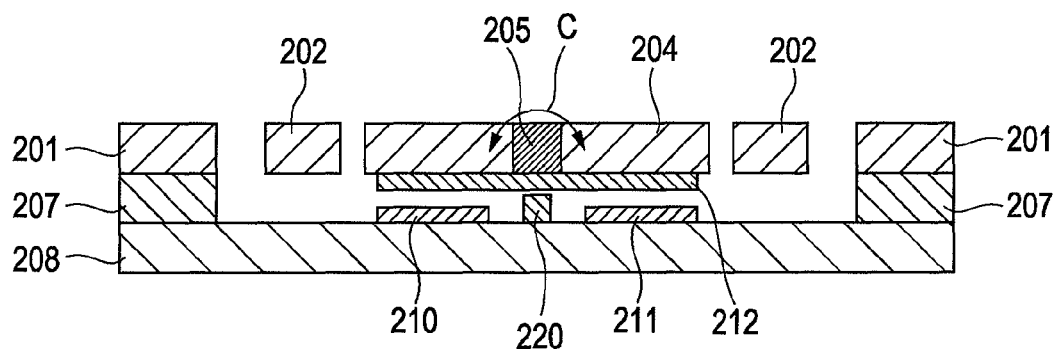
FIG. 8A is a sectional view of an angular velocity sensor according to a fourth embodiment of the present invention.
Figure 8B:
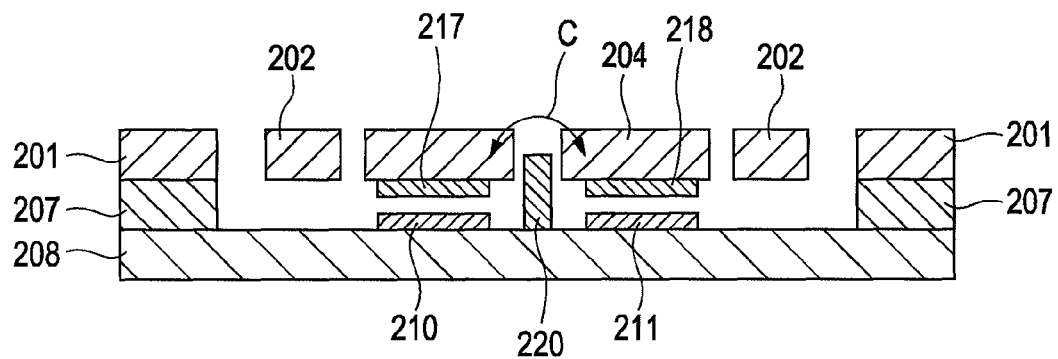
FIG. 8B is a sectional view of the angular velocity sensor according to the fourth embodiment.
Figure 8C:
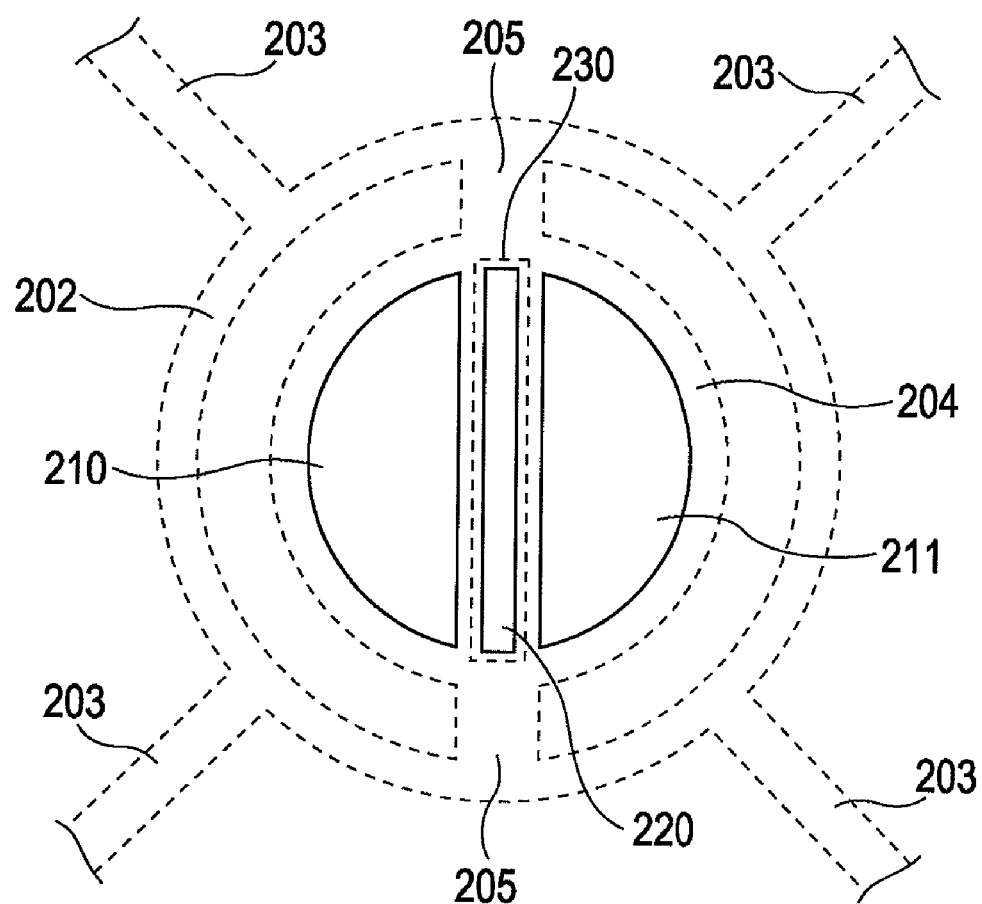
FIG. 8C is a top view of the angular velocity sensor according to the fourth embodiment.

A fourth embodiment shown in FIGS. 8A to 8C differs from the first embodiment in that an electrostatic shield 220 is provided between the first electrode 210 and the second electrode 211. The fourth embodiment is otherwise the same as the first embodiment.

FIG. 8A shows a first type of angular velocity sensor according to this embodiment. FIG. 8A is a sectional view taken perpendicularly to the substrate 201. As shown in FIG. 8A, the electrostatic shield 220 is provided between the first electrode 210 and the second electrode 211 on the lower supporting substrate 208 so as to extend substantially along the direction of the rotation axis of the detecting oscillator 204. The electrostatic shield 220 is formed with an appropriate height and along a length as long as or longer than the detecting electrode 212 and the electrodes 210 and 211 in the direction of the rotation axis. Furthermore, the electrostatic shield 220 is maintained at the same potential as the electrode reference potential Vr applied to the detecting electrode 212. The electrostatic shield 220 may be formed of any metallic material having a conductivity suitable for an electrostatic shield, such as aluminum, stainless steel, or copper.

With the electrostatic shield 220, the values of the capacitances C2 and C3 become very small. Thus, the inclination of the detecting oscillator 204 can be detected using the detecting electrode 212 purely on the basis of changes in the values of the capacitances C1 and C4.

FIGS. 8B and 8C show a second type of angular velocity sensor according to this embodiment. FIG. 8B is a sectional view, and FIG. 8C is a top view. In the second type of angular velocity sensor, the detecting electrode 212 is replaced with a first detecting electrode 217 and a second detecting electrode 218, and the detecting oscillator 204 has a through hole 230 between the detecting electrode 217 and the detecting electrode 218. The through hole 230 extends with a suitable length along the direction of the rotation axis. The electrostatic shield 220 extends along a suitable length with a height larger than the height of the spacer 207 so that its upper portion extends into the through hole 230. The width of the electrostatic shield 220 is chosen to be sufficiently smaller than the width of the through hole 230 so as not to interfere with reciprocating rotational oscillation of the detecting oscillator 204. In this embodiment, the electrostatic shield 220 is extended inside the through hole of the detecting oscillator 204, so that the values of the capacitances C2 and C3 can be reduced even further.

With the angular velocity sensor according to this embodiment, the inclination of the detecting oscillator 204 can be detected directly in the form of changes in the values of the capacitances C1 and C4. Thus, the inclination of the detecting oscillator 204 can be detected even more precisely.

Fifth Embodiment

Next, a fifth embodiment will be described with reference to FIGS. 9A and 9B. The fifth embodiment differs from the first embodiment in that third and fourth electrodes are provided. The fifth embodiment is otherwise the same as the first embodiment.

Figure 9A:
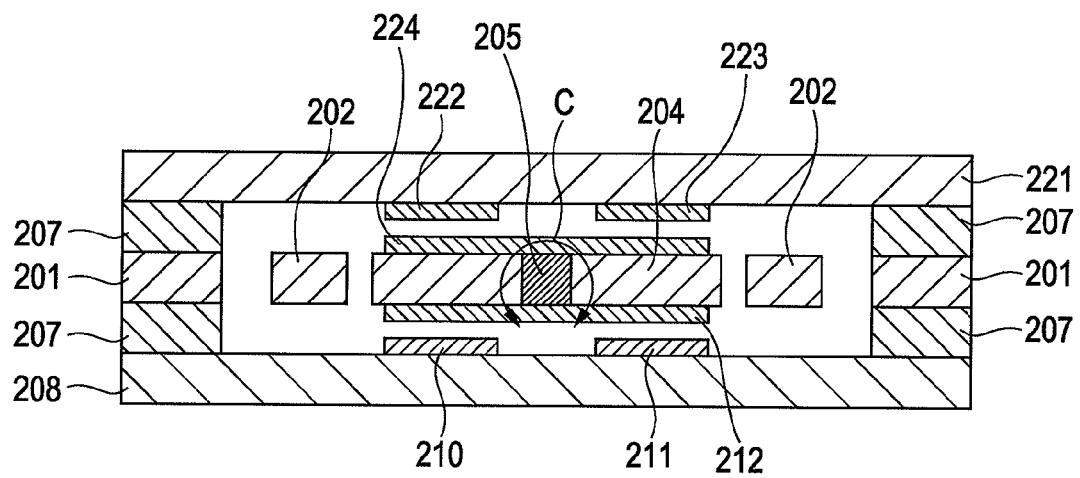
FIGS. 9A and 9B are sectional views of an angular velocity sensor according to a fifth embodiment of the present invention.
Figure 9B:
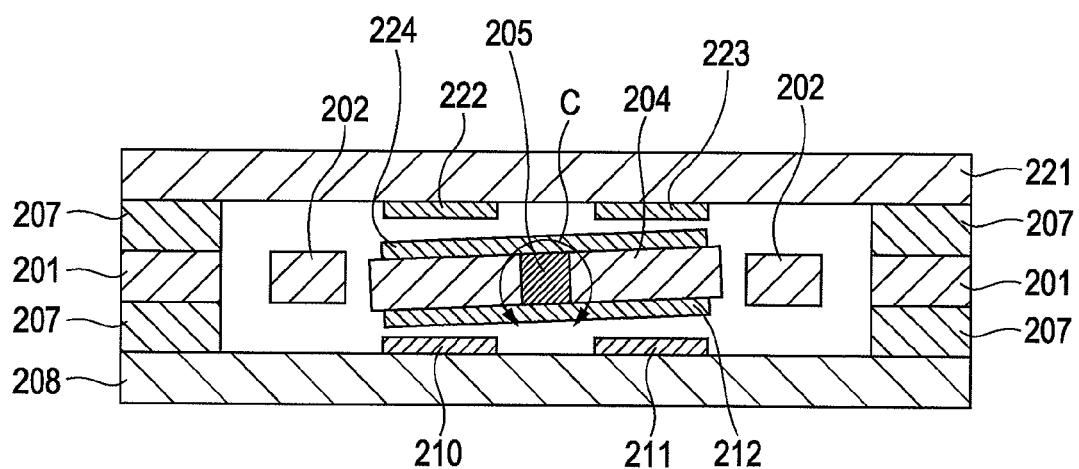

FIGS. 9A and 9B are sectional views of an angular velocity sensor according to this embodiment. In FIGS. 9A and 9B, 221 denotes an upper supporting substrate, 222 denotes a third electrode, 223 denotes a fourth electrode, and 224 denotes a second detecting electrode. In this embodiment, in addition to the components of the first embodiment, the upper supporting substrate 221, the third electrode 222, the fourth electrode 223, and the second detecting electrode 224 are additionally provided as components. The first electrode 210 and the third electrode 222, and the second electrode 211 and the fourth electrode 223 are provided so as to be individually plane-symmetrical with respect to a center plane extending in an intra-plane direction of the detecting oscillator 204. The detecting electrode 212 is provided on a lower surface of the detecting oscillator 204, and the second detecting electrode 224 is provided on an upper surface of the detecting oscillator 204. On the upper supporting substrate 221, the third electrode 222 and the fourth electrode 223 are provided. The upper supporting substrate 221 is connected to the substrate 201 via the spacer 207.

In this embodiment, from the signal supplying unit described earlier, the first AC signal 301 is applied to the first electrode 210 and the fourth electrode 223, and the second AC signal 302 is applied to the second electrode 211 and the third electrode 222.

According to this embodiment, the detecting oscillator 204 receives equal attractive forces from above and below at the same timing. Thus, compared with the case where attractive forces are applied from only one direction, oscillation of the detecting oscillator 204 caused by the AC signals 301 and 302 is further inhibited. Thus, the detecting oscillator 204 is maintained at the neutral position for detection when no angular velocity is input. As a result, occurrence of detection noises can be suppressed further. This serves to improve precision of detection particularly when an angular velocity is to be detected precisely.

Furthermore, when the detecting oscillator 204 is inclined as shown in FIG. 9B, the first electrode 210 becomes closer to the detecting electrode 212 and the fourth electrode 223 becomes closer to the second detecting electrode 224. On the other hand, the second electrode 211 becomes remoter from the detecting electrode 212 and the third electrode 222 becomes remoter from the second detecting electrode 224. At this time, the same AC signal 301 is being applied to the first electrode 210 and the fourth electrode 223. Thus, waveforms representing change in the amount of charges induced at the detecting electrode 212 by the first electrode 210 and change in the amount of charges induced at the second detecting electrode 224 by the fourth electrode 223 have the same phase, and have amplitudes larger than amplitudes in the case where the detecting oscillator 204 is not inclined.

On the other hand, the second electrode 211 and the third electrode 222 receives the same second AC signal 302. Thus, waveforms representing change in the amount of charges induced at the detecting electrode 212 by the second electrode 211 and change in the amount of charges induced at the second detecting electrode 224 by the third electrode 222 have the same phase and have amplitudes smaller than the amplitudes in the case where the detecting oscillator 204 is not inclined.

Thus, when the detecting oscillator 204 is displaced, charges are induced at the detecting electrode 212 by the first and second AC signals 301 and 302 individually supplied to the first and second electrodes 210 and 211, and charges are induced at the second detecting electrode 224 by the first and second AC signals 301 and 302 individually supplied to the fourth electrode 223 and the third electrode 222. The sensor according to this embodiment detects an acceleration as a physical quantity on the basis of signals corresponding to these induced charges.

The charges induced at the detecting electrode 212 and the second detecting electrode 224 are added together, and the sum is converted by the amount-of-charges measurement unit 216 into a detection signal in the form of a voltage or the like. Accordingly, sensitivity is substantially doubled compared with the first embodiment.

With the angular velocity sensor according to this embodiment, it is possible to detect an angular velocity with improved sensitivity and output stability.

Although the embodiments described above relate to angular velocity sensors having a reference oscillator and in which a detecting oscillator performs a reciprocating rotational oscillation, the present invention can be applied to a simple physical quantity sensor, such as an angular velocity sensor, including only a detecting oscillator, or to a physical quantity sensor, such as an angular velocity sensor or an acceleration sensor, in which a detecting oscillator performs a reciprocating translational oscillation.

Figure 9C:
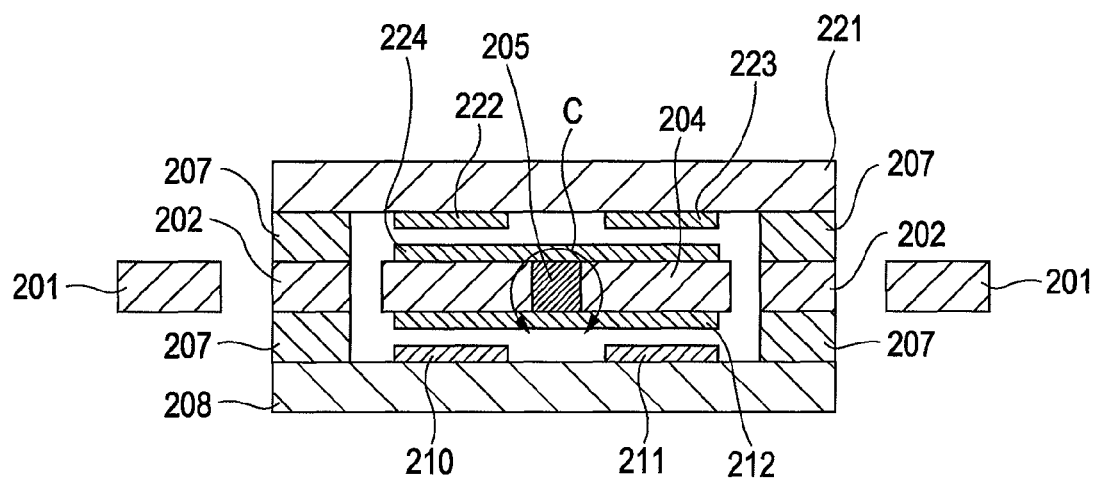
FIG. 9C is a sectional view of a modification of the fifth embodiment.

The features of this embodiment are also applicable to a configuration in which the electrodes 210, 211, 222, and 223 are integrated with the reference oscillator 202, as shown in FIG. 9C.

Sixth Embodiment

Next, an angular velocity sensor according to a sixth embodiment will be described with reference to FIGS. 10A and 10B. The sixth embodiment differs from the first embodiment in that no reference oscillator is provided and only a detecting oscillator is provided. The sixth embodiment is otherwise the same as the first embodiment.

Figure 10A:
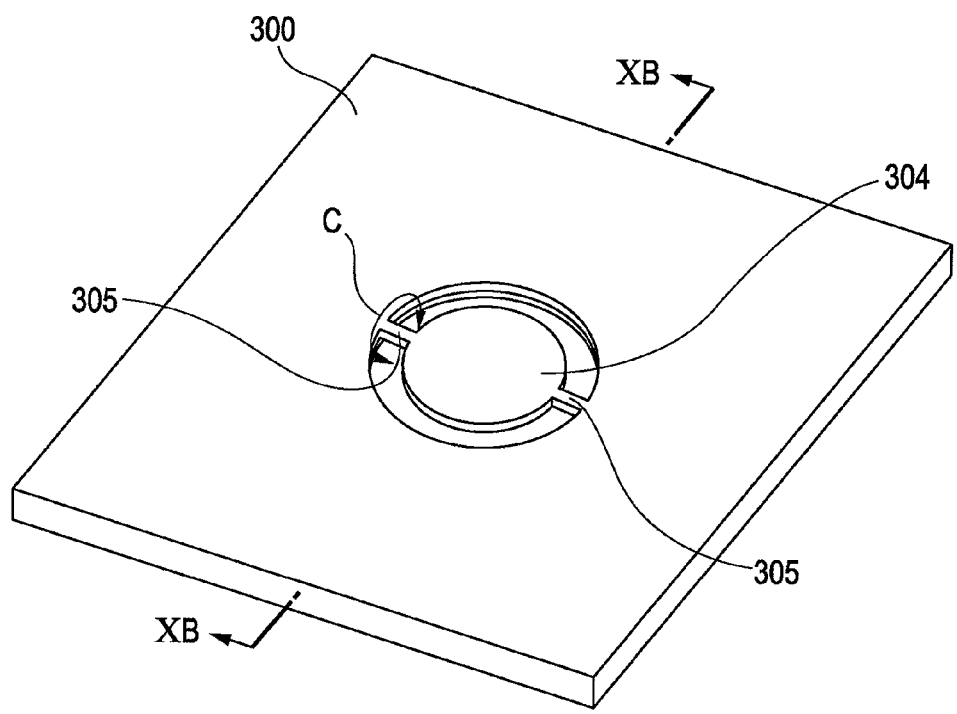
FIG. 10A is a perspective view of a physical quantity sensor according to a sixth embodiment of the present invention.
Figure 10B:
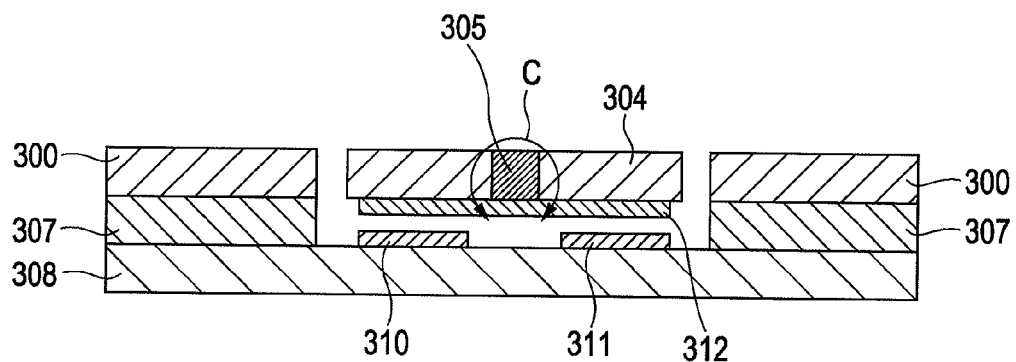
FIG. 10B is a sectional view of the physical quantity sensor according to the sixth embodiment, taken along line XB-XB in FIG. 10A.

FIGS. 10A and 10B show the angular velocity sensor according to this embodiment. FIG. 10A is a perspective view, and FIG. 10B is a sectional view taken along line XB-XB perpendicularly to a substrate 300. In FIGS. 10A and 10B, 300 denotes a substrate, 304 denotes a detecting oscillator, 305 denotes supports for the detecting oscillator 304, 307 denotes a spacer, 308 denotes a lower supporting substrate, 310 denotes a first electrode (lower electrode), 311 denotes a second electrode (lower electrode), and 312 denotes a detecting electrode (upper electrode).

The description regarding the first and second AC signals 301 and 302 given with reference to FIGS. 2A to 2C, the description regarding charges induced at the detecting oscillator 304 given with reference to FIGS. 4A to 4D and FIGS. 5A to 5D, and the principle of detection of inclination of the detecting oscillator 304, described in the context of the first embodiment, also apply in this embodiment. In this embodiment, the magnitude of a physical quantity such as an angular velocity about an axis of rotational oscillation of the detecting oscillator 304 is detected by detecting the magnitude of inclination of the detecting oscillator 304 caused by a force applied about the axis due to the physical quantity.

According to this embodiment, it is possible to implement a physical quantity sensor with high precision that can measure the inclination of the detecting oscillator 304 with high sensitivity.

Seventh Embodiment

Next, a physical quantity sensor according to a seventh embodiment, such as an acceleration sensor, will be described with reference to FIG. 11. In this embodiment, a reference oscillator is not provided, and only a detecting oscillator that is capable of performing a reciprocating translational oscillation is provided.

Figure 11:
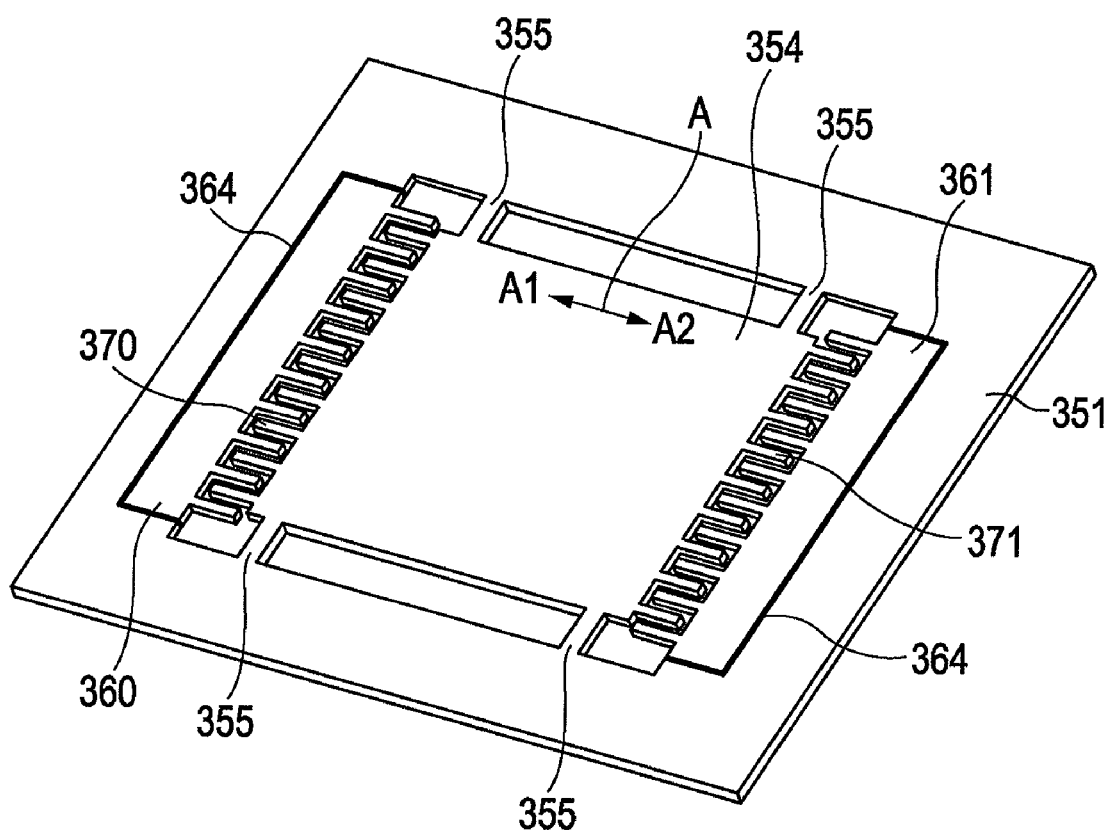
FIG. 11 is a plan view of a physical quantity sensor according to a seventh embodiment of the present invention.
Figure 12A:
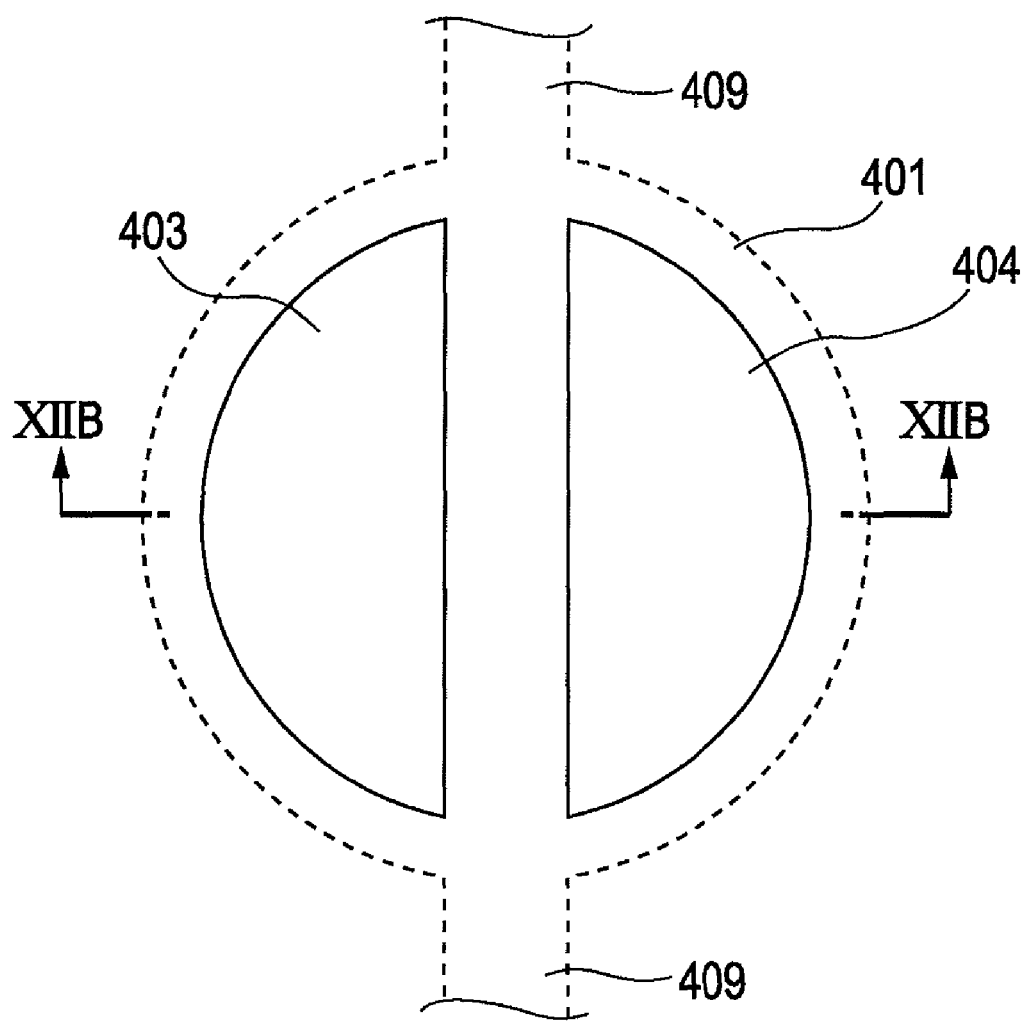
FIG. 12A is a top view for explaining an angular velocity sensor according to the related art and its problems.
Figure 12B:
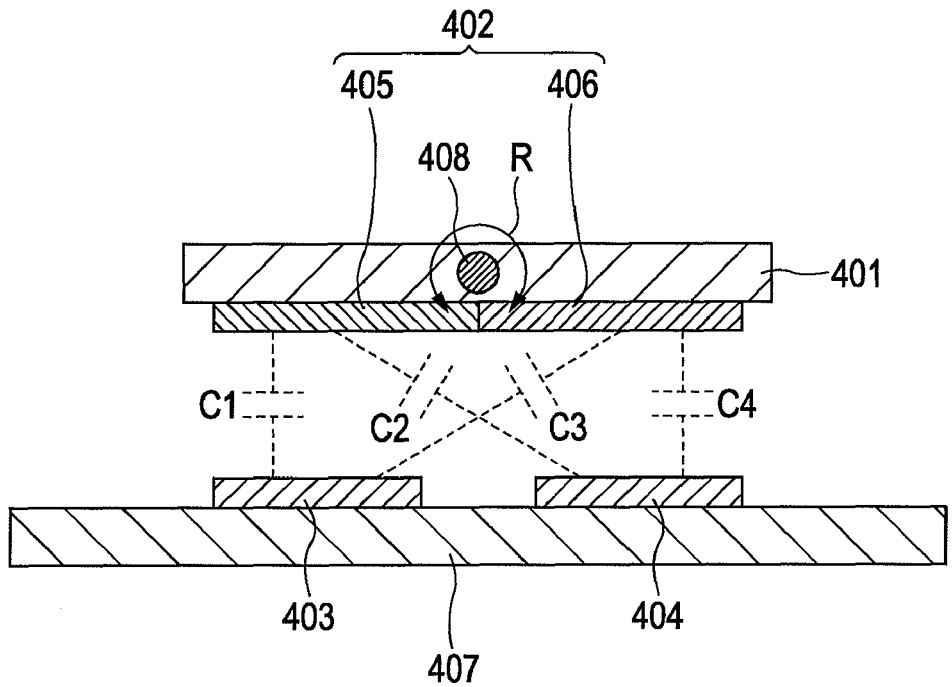
FIG. 12B is a sectional view for explaining the angular velocity sensor according to the related art and its problems, taken along line XIIB-XIIB in FIG. 12A.
Figure 12C:
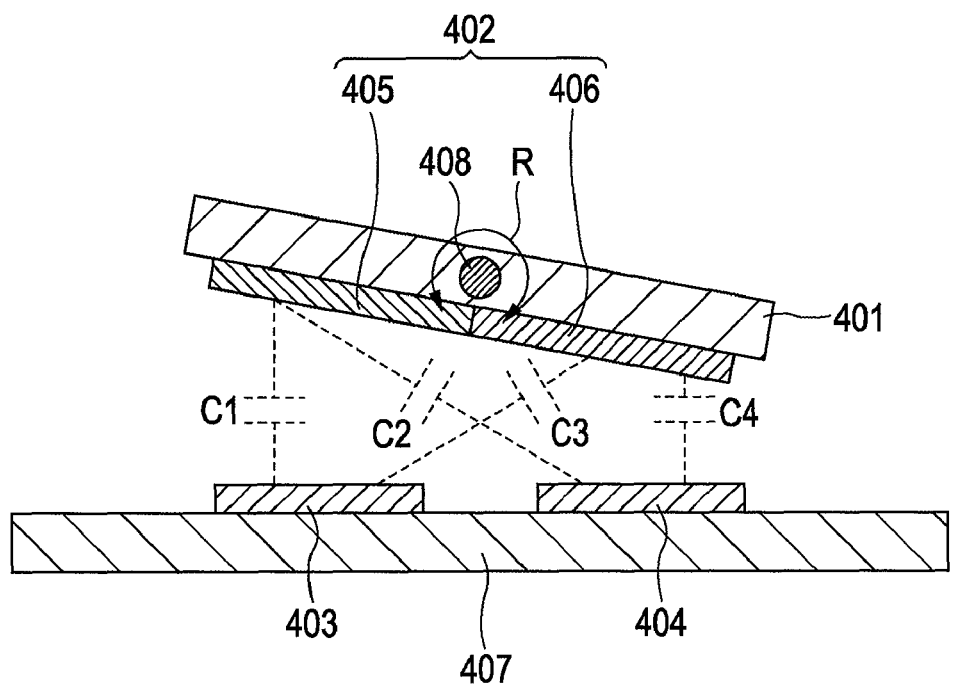
FIG. 12C is a sectional view for explaining the angular velocity sensor according to the related art and its problems.

FIG. 11 is a perspective view of the physical quantity sensor according to this embodiment. In FIG. 11, 351 denotes a substrate, 354 denotes a detecting oscillator that is capable of performing a reciprocating translational oscillation in the direction A, which also functions as a detecting electrode, 355 denotes supports for the detecting oscillator 354, 360 denotes a first comb-shaped electrode, 361 denotes a second comb-shaped electrode, 364 denotes an insulator for forming an electrode in the substrate 351, and 370 and 371 denote comb-shaped electrode portions of the detecting electrode (detecting oscillator) 354 facing the comb-shaped electrodes 360 and 361 via gaps.

Also in this embodiment, the description regarding the first and second AC signals 301 and 302 given with reference to FIGS. 2A to 2C, the description regarding charges induced at the detecting oscillator 354 given with reference to FIGS. 4A to 4D and FIGS. 5A to 5D, and the principle of detection of inclination of the detecting oscillator 354, described in the context of the first embodiment, also apply in this embodiment. Compared with the sixth embodiment, the detecting electrode and electrodes in this embodiment have different forms and layout, but the principle of operation is the same. According to this embodiment, the magnitude of a physical quantity such as an acceleration in the direction of translational oscillation of the detecting oscillator 354 is detected by detecting the magnitude of displacement of the detecting oscillator 354 caused by a force applied to the detecting oscillator 354 due to the physical quantity.

According to this embodiment, it is possible to implement a physical quantity sensor with high precision that can measure a translational displacement of the detecting oscillator 354 with high sensitivity.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-119641 filed Apr. 27, 2007, which is hereby incorporated by reference herein in its entirety.

What is claimed is:

1. An angular velocity sensor comprising:
a reference oscillator;
a reference oscillation generating unit configured to cause the reference oscillator to generate reference oscillation;
a detecting oscillator supported by the reference oscillator in such a manner that the detecting oscillator is able to rotationally oscillate about a first rotation axis;
first and second electrodes configured to receive application of alternating-current signals, wherein the first and second electrodes are provided on the reference oscillator;
a first detecting electrode facing the first and second electrodes, wherein the first detecting electrode is provided on the detecting oscillator;
third and fourth electrodes;
a second detecting electrode facing the third and fourth electrodes; and
a signal supplying unit configured to supply first and second alternating-current signals respectively to the first and second electrodes,
wherein the reference oscillation generating unit causes the reference oscillator to rotationally oscillate about a second rotation axis,
wherein the reference oscillation generating unit, the first and second electrodes and the first detecting electrode are electrically separated from each other,
wherein the first and second alternating-current signals respectively supplied to the first and second electrodes cause the detecting oscillator to be maintained at a neutral position for detection without being displaced when no angular velocity is input, and when the detecting oscillator is displaced, an input angular velocity is detected on the basis of a signal corresponding to charges induced at the first detecting electrode by the first and second alternating-current signals supplied respectively to the first and second electrodes,
wherein the first and third electrodes are disposed plane-symmetrically with respect to the detecting oscillator, and the second and fourth electrodes are disposed plane-symmetrically with respect to the detecting oscillator,
wherein the signal supplying unit further supplies the second alternating-current signal to the third electrode and the first alternating-current signal to the fourth electrode, and
wherein when the detecting oscillator is displaced, the physical quantity is detected on the basis of the signal corresponding to the charges induced at the first detecting electrode by the first and second alternating-current signals supplied respectively to the first and second electrodes and on the basis of a signal corresponding to charges induced at the second detecting electrode by the first and second alternating-current signals supplied respectively to the fourth and third electrodes.

2. The angular velocity sensor according to claim 1, further comprising an amount-of-charges measurement unit configured to assign a reference potential to the first detecting electrode and to detect the angular velocity on the basis of the signal corresponding to the induced charges, wherein the first and second alternating-current signals are alternating-current signals that alternate with reference to the reference potential and that have a same frequency and mutually opposite phases.

3. The angular velocity sensor according to claim 1, wherein the first detecting electrode is formed of segments individually corresponding to the first and second electrodes.

4. The angular velocity sensor according to claim 1, wherein the first detecting electrode is formed within a portion of the detecting oscillator, the portion of the detecting oscillator being insulated by an insulator from another portion of the detecting oscillator.

5. The angular velocity sensor according to claim 1, further comprising an electrostatic shield provided between the first and second electrodes.

* * * * *